(12) United States Patent
Nanjo et al.

(10) Patent No.: US 7,880,797 B2
(45) Date of Patent: Feb. 1, 2011

(54) TILT LENS SYSTEM AND IMAGE PICKUP APPARATUS

(75) Inventors: Yusuke Nanjo, Kanagawa (JP); Masafumi Sueyoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 452 days.

(21) Appl. No.: 12/149,869

(22) Filed: May 9, 2008

(65) Prior Publication Data

US 2008/0309815 A1   Dec. 18, 2008

(30) Foreign Application Priority Data

Jun. 14, 2007  (JP)  ............................. 2007-157285

(51) Int. Cl.
*H04N 5/225* (2006.01)
*G03B 13/00* (2006.01)
*G02B 27/64* (2006.01)
*G02B 13/10* (2006.01)

(52) U.S. Cl. ........................ 348/335; 348/345; 348/351; 359/557; 359/433

(58) Field of Classification Search ................. 348/335, 348/343, 345, 351; 359/554, 557, 433
See application file for complete search history.

(56) References Cited

U.S. PATENT DOCUMENTS 5,249,079 A * 9/1993 Umeda ........................ 359/554
5,521,758 A * 5/1996 Hamano ..................... 359/557
5,642,223 A * 6/1997 Hasushita et al. ........... 359/557
6,414,800 B1 * 7/2002 Hamano ..................... 359/687

FOREIGN PATENT DOCUMENTS

| JP | 04-243212 | 8/1992 |
| JP | 04-263207 | 8/1992 |
| JP | 2000-292689 | 10/2000 |

* cited by examiner

*Primary Examiner*—Nhan T Tran
(74) *Attorney, Agent, or Firm*—Rader, Fishman & Grauer PLLC

(57) ABSTRACT

A tilt lens system includes a focus lens unit movable during focusing; a diaphragm sharing a primary optical axis with the focus lens unit; and a tilt lens unit, arranged on an image side of the focus lens unit and the diaphragm, having a negative refractive power and an optical axis tiltable with respect to the primary optical axis. Conditional Expressions (1) and (2) are satisfied as follows, $$1.3 < \beta t < 1.7 \tag{1}$$

$$0 < P < H1 \tag{2}$$

where $\beta t$ is a lateral magnification of the tilt lens unit in a not tilted state, P is a distance from a most object side surface of the tilt lens unit to a rotating center of the tilt lens unit in a tilted state, and H1 is a distance from the most object side surface of the tilt lens unit to a first principal point of the tilt lens unit.

10 Claims, 26 Drawing Sheets

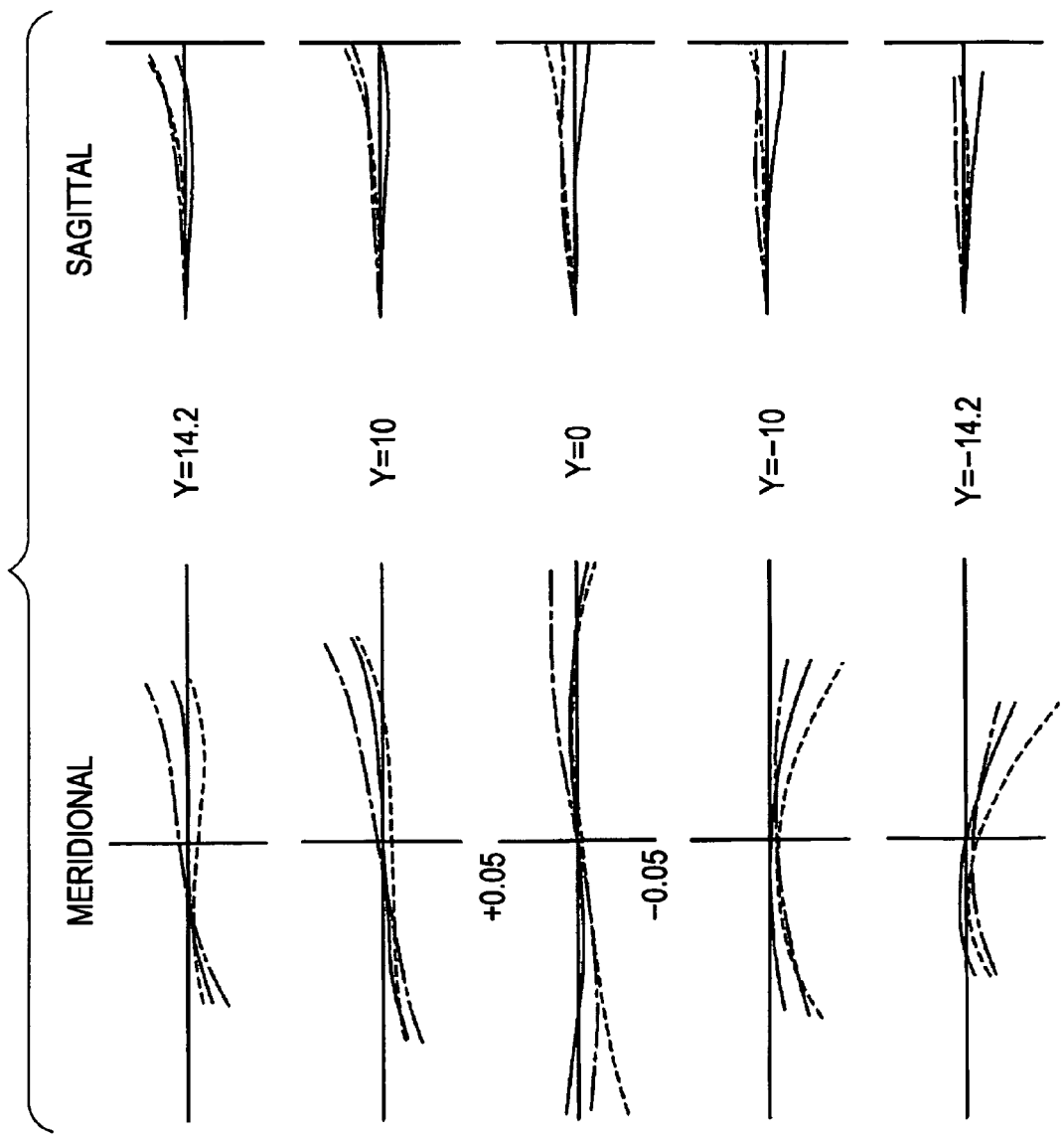

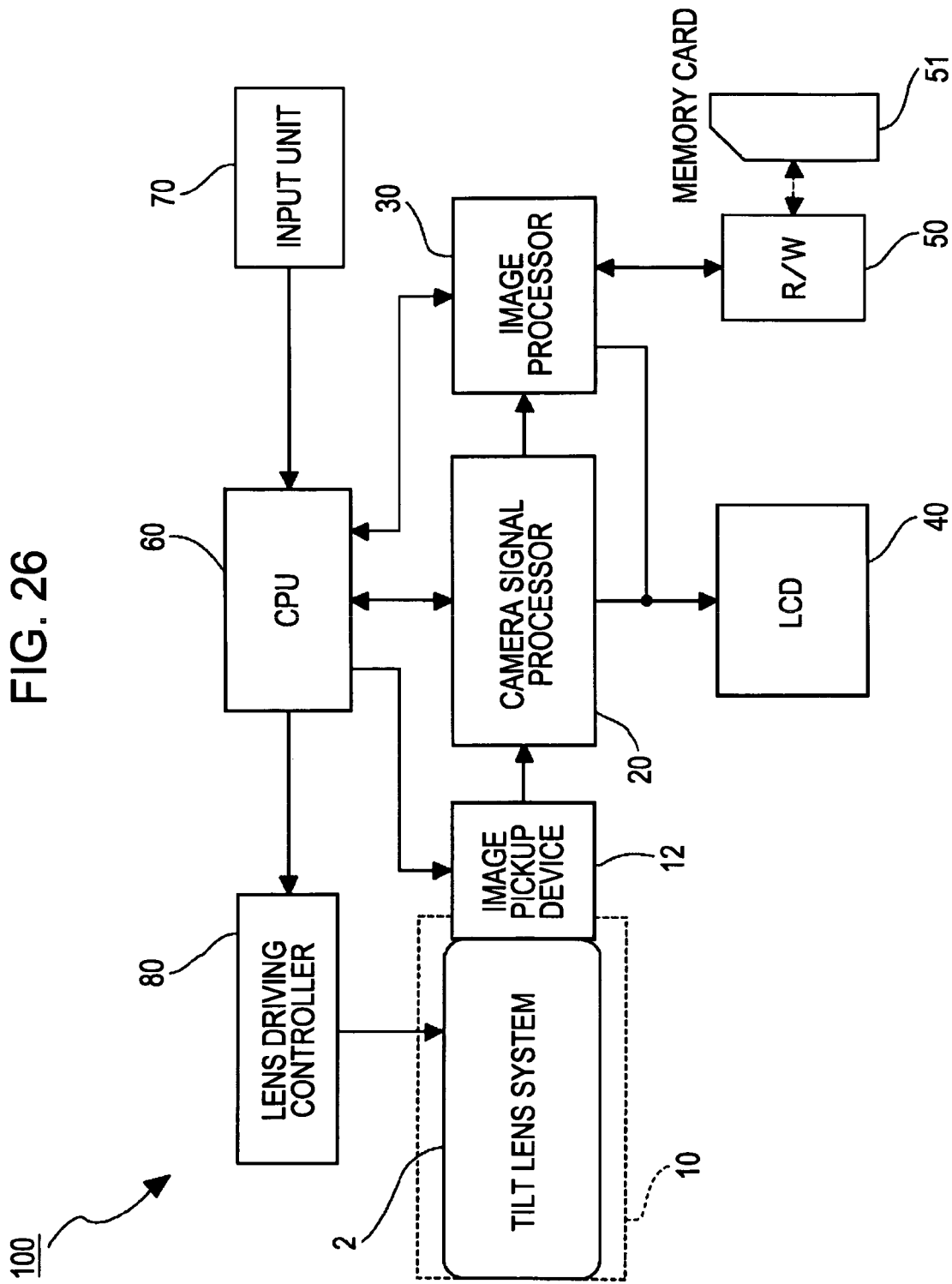

TILT LENS SYSTEM AND IMAGE PICKUP APPARATUS

CROSS REFERENCES TO RELATED APPLICATIONS

The present invention contains subject matter related to Japanese Patent. Application JP 2007-157285 filed in the Japanese Patent Office on Jun. 14, 2007, the entire contents of which are incorporated herein by reference.

BACKGROUND OF THE INVENTION

1. Field of the Invention

The present invention relates to new tilt lens systems and image pickup apparatuses. More particularly, the present invention relates to a tilt lens system, and an image pickup apparatus having the tilt lens system, for a video camera, a digital camera, or a digital camera or a film camera of single-lens reflex type. The tilt lens system has a tilt function, capable of focusing on not only an object arranged in parallel to an image pickup surface, but also an object arranged in a tilted manner with respect to the image pickup surface, without degrading an autofocus function and an exposure measurement function.

2. Description of the Related Art

In a typical image pickup apparatus, the optical axis of a lens is arranged perpendicularly to an image pickup surface, which is an image pickup device or a film, at the center thereof. Hence, for example, when a high building is photographed at a low angle, the resultant perspective causes the top of the building to appear smaller than its base. In addition, it is difficult to focus on the entire object plane which is tilted with respect to the image pickup surface. An aperture of a diaphragm is decreased to increase the depth of field, to photograph a picture as in focus. To reduce the problem in photographing, the optical axis of the lens is moved in parallel to the image pickup surface, or tilted with respect to the image pickup surface. Such movements are called perspective control.

To compensate the perspective caused by the low angle shot, an object, the principal plane of the lens, and the image pickup surface are arranged and held to be parallel to each other, and a photographing range is thus determined. This operation, called flaming, is performed by shifting the position at which the optical axis meets the image pickup surface. This kind of perspective control operation is usually called shift, rise, fall, and the like, depending on the shift direction of the operation, however, in this specification, the operation in any shift direction is called shift.

To focus on a plane tilted with respect to the image pickup surface, the principal plane of the lens and the image pickup surface are moved to not be parallel to each other. This kind of perspective control operation is usually called swing, tilt, and the like, depending on the tilt direction of the operation; however, in this specification, the operation in any tilt direction is called tilt.

Examples of the image pickup apparatuses capable of performing the perspective control may be cameras called view cameras and folding dark boxes in which a lens board and an image pickup surface are connected through a concertina-like cloth, so that the positional relationship therebetween can be desirably controlled. However, in this type of camera, a perspective control operation and focusing have to be performed while a user is viewing an inverted image projected on a focusing screen. Such cameras are extremely difficult to use, and therefore, the cameras are considered as special cameras.

A single-lens reflex camera is a popular type of camera. As its interchangeable lens, there is provided one having shift and tilt functions. This provides a more user-friendly perspective control operation in comparison with a view camera. However, if the perspective control operation is performed with this lens, an area outside an image height of a normal screen size may be used. In lens design, it is desired to cover a larger image circle than that of the normal interchangeable lens, with an image quality equivalent to that of the normal interchangeable lens. Japanese Unexamined Patent Application Publication No. 2000-292689 discloses an example of such an interchangeable lens.

In recent years, most of the image pickup apparatuses are digital cameras using image pickup devices instead of films. Even if films are used for photographing, the pictures are converted into digital information with scanners, and output to various media. To output the digital image information as a printout, a printing original, a computer image, or the like, the digital image information is frequently processed using an image editing software called a photo retouch software. The photo retouch software has various functions, such as adjustment of color, brightness, contrast, and sharpness; trimming; image synthesis; etc. One of the various functions may be a perspective compensation function. In particular, in a case where a normal camera is used for photographing and a building is photographed by low angle shot, thereby the top of the building being smaller than its base, the image is deformed to a trapezoid, and then is trimmed to a rectangle, so that the width of the top of the building is increased by digital signal processing. Accordingly, an effect of photographing with shifting can be provided for the image. Since the image is deformed to the trapezoid, the resolution of the extended upper portion of the screen may be decreased. However, data from the single-lens reflex digital camera, or data read from the film using the scanner with a high pixel pitch originally has a sufficient resolution. Hence, a certain decrease in the resolution does not have to be considered. Since the use of such a photo retouch software has become popular in recent years, a shift operation, which is difficult to use during photographing, is no longer necessary.

Also, one of effects of the tilt operation provides a photographing method, in which, when a landscape at infinity is photographed, a part of the screen is intentionally focused and the residual part is defocused, so as to make an actual landscape to be photographed like a diorama at close range. This effect may also be provided by the photo retouch software. In particular, an image in focus entirely is used, the image except for a part of the image is intentionally defocused, and accordingly, the image has an effect like being defocused by tilting.

Therefore, the effect not provided by the photo retouch software, and provided only by the perspective control lens is an effect satisfying the Scheimpflug rule, in which, when an object plane, the principal plane of the lens, and the image pickup surface are arranged to intersect with each other at a ridge, a tilted object plane is in focus.

Japanese Unexamined Patent Application Publication No. 4-243212 and No. 4-243207 disclose related arts capable of performing the tilt operation.

SUMMARY OF THE INVENTION

Typical image pickup apparatuses usually have autofocus (AF) and auto exposure (AE) functions. The above-mentioned interchangeable lens with the perspective control function may have a manual focus function instead of AF, or a fully automatic diaphragm control. When the perspective control function is not used, AE is correctly operated. However, when the perspective control is performed, the center of an exit pupil may be deviated from the center of a screen, or the exit pupil may be tilted during tilting. The positional relationship among the exit pupil, a Fresnel lens on a focusing screen, and a photometric device may be destructed. Accordingly, AE may not be correctly operated. In the manual focus type, the fully automatic diaphragm control is a mechanical interlock mechanism. If diaphragm blades are deviated from the optical axis due to the perspective control, or tilted together with the optical axis, the mechanical interlock may be extremely difficult. Thus, a preset diaphragm that a user manually decreases the aperture of the diaphragm is employed. Accordingly, AE may be incorrectly operated unless the aperture of the diaphragm is the open aperture, even when the perspective control is not performed.

As described above, the interchangeable lens with the perspective control function may provide a photographing effect that is not provided by other lenses. However, such a lens may have bottlenecks. For example, AF may not be used even during normal photographing. In addition, the user has to operate the preset diaphragm, which is difficult to use. Further, to perform the tilt control, troublesome operations, including manually focusing on an object, tilting to be aligned with the tilt of the object, thereby the object being defocused, manually focusing on the object again, and tilting again, have to be repeated to adjust the focus and the tilt angle to be optimum. This is extremely difficult to use.

Japanese Unexamined Patent Application Publication No. 4-243212 and No. 4-243207 disclose a paraxial optical configuration which prevents an image which is on the optical axis before tilting, from being moved from the center even during tilting, in a lens system of tilting a part of the lens system to obtain a perspective control effect. Therefore, the related arts assume that the problem during tilting of the partial lens unit is the movement of the center image. However, the major problem during tilting of the partial lens unit is performance degradation caused by unbalanced aberration compensation when the condition of the optical system is continuously changed from a coaxial optical system to a decentered optical system. It is desired to maintain the focusing performance in the whole optical system even with the unbalanced aberration compensation; however, the related arts do not disclose configurations or numerical examples to overcome such problems. Therefore, the related arts could not provide a useful tilt lens system.

Accordingly, it is desirable to provide a tilt lens system and an image pickup apparatus having the tilt lens system. The tilt lens system does not have a shift function which can be performed by the photo retouch software as mentioned above. In the tilt lens system, while elements relating to AF and AE are arranged constantly on the primary optical axis, only a partial lens unit is tilted to enable photographing satisfying the Scheimpflug rule; and not only in a normal use condition, but also during tilting, AF and AE can be used, to realize an easy operation of photographing with tilting, and to markedly reduce a variation in aberration.

A tilt lens system according to an embodiment of the invention includes a focus lens unit being movable during focusing, a diaphragm sharing a primary optical axis with the focus lens unit at the center of the diaphragm and being arranged with or within the focus lens unit, and a tilt lens unit having a negative refractive power and having an optical axis capable of being tilted with respect to the primary optical axis. The tilt lens unit is arranged on the image side of the focus lens unit and the diaphragm. Also, Conditional Expressions (1) and (2) are satisfied as follows:

$$1.3 < \beta t < 1.7 \quad (1)$$

$$0 < P < H1 \quad (2)$$

where $\beta t$ is a lateral magnification of the tilt lens unit when the optical axis is not tilted, P is a distance from a most object side surface of the tilt lens unit to a rotating center of the tilt lens unit when the optical axis of the tilt lens unit is tilted, and H1 is a distance from the most object side surface of the tilt lens unit to a first principal point of the tilt lens unit.

An image pickup apparatus according to an embodiment of the invention includes the above-described tilt lens system, and an image pickup device converting an object image formed with the tilt lens system into an electric signal.

With the invention, by tilting the partial lens unit, photographing satisfying the Scheimpflug rule can be provided. Also, AF and AE can be used not only in a normal use condition, but also during tilting; thereby an operation of photographing with tilting can be easily performed.

BRIEF DESCRIPTION OF THE DRAWINGS

FIG. 25 illustrates aberration diagrams showing lateral aberrations when a tilt lens unit and an object plane are tilted at the same lens position as FIG. 24; and FIG. 26 is a circuit block diagram showing a configuration in which the image pickup apparatus according to an embodiment of the invention is applied to a digital still camera.

DESCRIPTION OF THE PREFERRED EMBODIMENTS

A tilt lens system and an image pickup apparatus according to a preferred embodiment of the invention is described below.

First, a tilt lens system according to an embodiment of the invention is described.

The tilt lens system according to the embodiment of the invention includes a focus lens unit being movable during focusing, a diaphragm sharing a primary optical axis with the focus lens unit at the center of the diaphragm and being arranged with or within the focus lens unit, and a tilt lens unit having a negative refractive power and having an optical axis capable of being tilted with respect to the primary optical axis. The tilt lens unit is arranged on the image side of the focus lens unit and the diaphragm. Also, Conditional Expressions (1) and (2) are satisfied as follows:

$$1.3 < \beta t < 1.7 \quad (2)$$

$$0 < P < H1 \quad (2)$$

where $\beta t$ is a lateral magnification of the tilt lens unit when the optical axis is not tilted, P is a distance from a most object side surface of the tilt lens unit to a rotating center of the tilt lens unit when the optical axis of the tilt lens unit is tilted, and H1 is a distance from the most object side surface of the tilt lens unit to a first principal point of the tilt lens unit.

In this embodiment of the invention, by tilting only the partial lens unit, photographing satisfying the Scheimpflug rule can be provided. Also, AF and AE can be used not only in a normal use condition, but also during tilting; thereby an operation of photographing with tilting can be easily performed.

Figure 1:
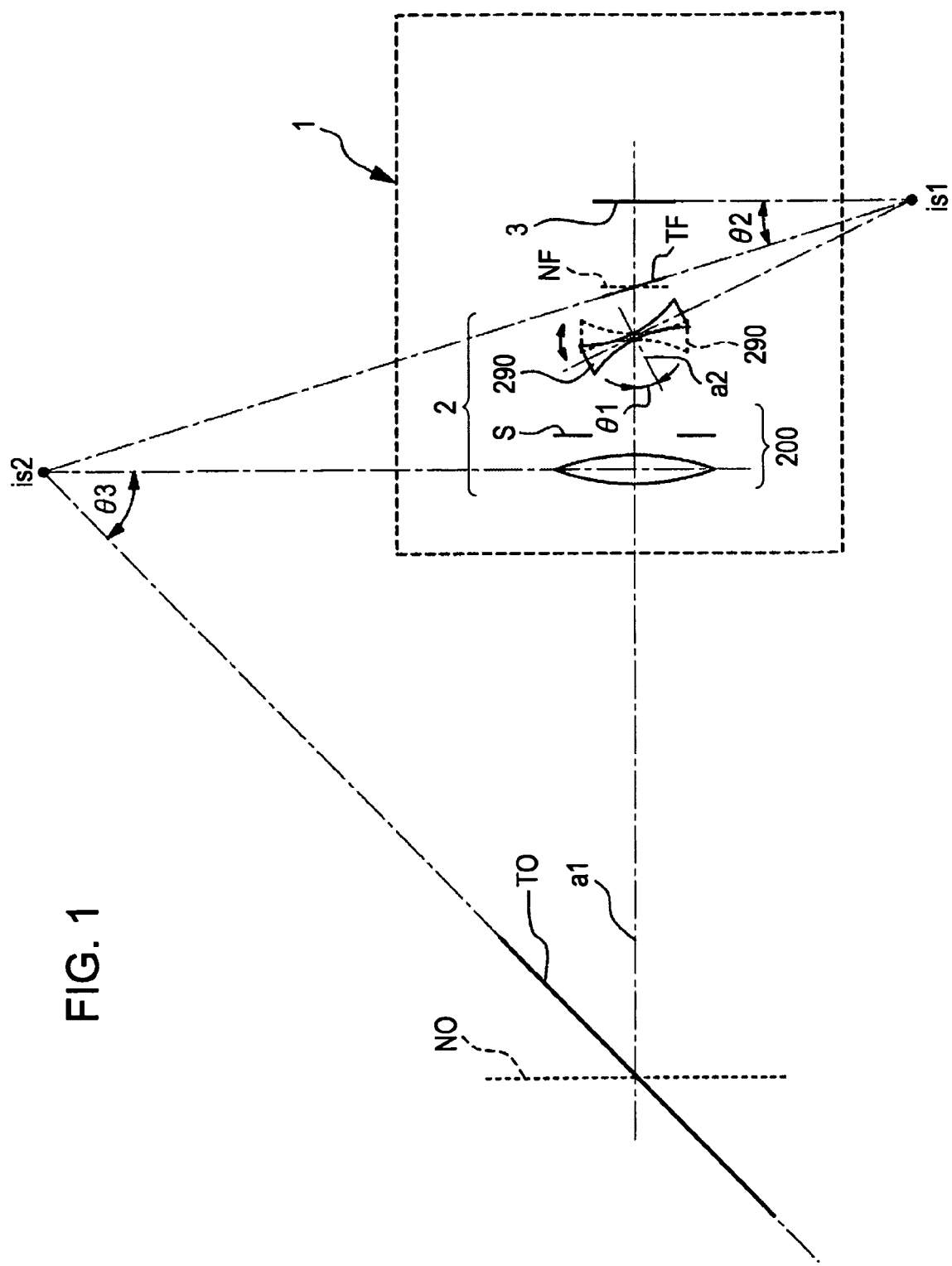
FIG. 1 is an explanatory illustration showing the principal of an operation of an image pickup apparatus using a tilt lens system according to an embodiment of the invention.

FIG. 1 is an explanatory illustration showing a basic paraxial refractive power arrangement and its effect of an image pickup apparatus using the tilt lens system according to the embodiment of the invention.

An image pickup apparatus 1 includes a tilt lens system 2 and an image pickup surface 3. The tilt lens system 2 includes a master lens system 200 having a focus lens unit and a diaphragm S, and a tilt lens unit 290 having a negative refractive power and being arranged on the image side of the master lens system 200. In a normal use condition without tilting, a primary optical axis a1 of the master lens system 200 is aligned with an optical axis a2 of the tilt lens unit 290, thereby defining a coaxial optical system. The primary optical axis a1 is perpendicular to the image pickup surface 3 substantially at the center. The image pickup surface 3 is an image pickup device or a film. The tilt lens unit 290 in this condition is indicated by a broken line. NF indicated by a broken line denotes an image plane, which is formed by the master lens system 200, of an object plane NO located at close range and being perpendicular to the primary optical axis a1. If the tilt lens unit 290 is not present, a real image is formed at this position of the image plane NF. The tilt lens unit 290 arranged between the master lens system 200 and the image plane NF uses the image plane NF as an input, and causes an enlarged output image to be focused on the image pickup surface 3.

Next, an effect when the optical axis a2 of the tilt lens unit 290 is tilted by a tilt angle θ1 is described. When the optical axis a2 is tilted such that the principal plane of the tilt lens unit 290 intersects with the image pickup surface 3 at an intersection is 1, an input plane conjugated with the image pickup surface 3 as the output is tilted so as to be aligned with the intersection is 1 according to the Scheimpflug rule, and the input plane becomes a plane TF at a tilt angle θ2 with respect to the image pickup surface 3. Next, concerning image formation with the master lens system 200, since the image plane as the output becomes the plane TF which is tilted by the angle θ2, the principal plane of the master lens system 200 intersects with the image plane TF at an intersection is 2. According to the Scheimpflug rule, the object plane as the input should become a plane TO, which is tilted by a tilt angle θ3, and shares the intersection is 2. Thus, an effect can be obtained in which if the tilt lens unit 290 is tilted counterclockwise by the tilt angle θ1 as shown in FIG. 1, the object plane in focus becomes the plane TO tilted clockwise by the tilt angle θ3.

Next, the principle for a normal operation of AF and AE during tilting is described. A perspective control lens for a single-lens reflex camera of a related art uses manual focus instead of AF because, in terms of optics, object information incident on an AF sensor may be asymmetric during the perspective control, and hence, AF by phase difference detection may cause an erroneous operation. A key factor of the object information incident on the AF sensor being asymmetric may be parallel decentration of an exit pupil due to shifting, or asymmetric aperture efficiency due to tilting of a thick photographic lens. An erroneous operation of AE may occur similarly to the above situation of AF. A ray exiting from the photographic lens depending on an open F-number and an aperture efficiency is diverged by a focusing screen located at a position equivalent to that of the image pickup surface, and is bent by a Fresnel lens located at the same position, and reaches a photometric device arranged near an eyepiece. If the tilt of the ray exiting from the lens and being incident on the Fresnel lens is changed due to a perspective control operation such as shifting or tilting, the brightness detected at the photometric device may be changed although an illuminance at the image plane is not changed. Thus, AE may be erroneously operated. The embodiment of the invention does not use shifting, which is the key factor of an erroneous operation of AF and AE, and allows a processing function of the photo retouch software to provide the function of shifting instead. Also, the focus lens unit and the diaphragm which may cause the ray exiting from the lens to be asymmetric are constantly arranged on the primary optical axis. Hence, the fixed diaphragm which may affect the aperture efficiency is arranged at a position not to be shifted from the primary optical axis. Accordingly, the ray reaching the AF sensor and the photometric device hardly becomes asymmetric during tilting, and hence, an erroneous operation hardly occurs.

Concerning the difficulty of forming a mechanical interlock mechanism between the lens and a body of the single-lens reflex camera, in terms of AF, a single-lens reflex camera system having a mechanism which drives a focus lens unit with a motor provided in the lens is becoming popular even for a system having a mechanism which drives a focus lens unit with a motor provided in the body. If such a mechanism drives the motor in the lens with an electric interlock mechanism without using the motor in the body, AF driving can be relatively easily performed. However, in terms of driving of the diaphragm, a system using an electric interlock mechanism with a motor in the lens is not popular. In many cases, a lever in the body and a lever in the lens are mechanically interlocked to perform instantaneous automatic diaphragm control. In this case, a perspective control lens to tilt the entire photographic lens may be tilted together with the diaphragm interlock lever which is directly connected to a diaphragm device in the lens. It is extremely difficult to mechanically correctly transmit the movement. Due to this, an interchangeable lens having a tilt function of a related art typically uses a preset diaphragm, in which a user manually closes and opens the diaphragm. In the embodiment of the invention, since the focus lens unit and the diaphragm are constantly arranged on the primary optical axis, a diaphragm interlock mechanism of a related art can be used. Then, only the compatibility between the tilt mechanism of the tilt lens unit 290 and the diaphragm interlock mechanism is a task to be overcome.

The erroneous operation of AF and AE in a single-lens reflex digital camera or film camera has been described above. In an image pickup apparatus in which an image pickup device also serves as sensors for AF and AE such as a compact digital camera, optical and mechanical restrictions may be reduced, and a task to avoid an erroneous operation may also be reduced.

The major feature of the tilt lens system according to the embodiment of the invention is being a markedly decentered optical system during tilting. To keep compensating aberration during tilting is more difficult as compared with a perspective control lens system of a related art, in which a coaxial optical system is unchanged during tilting. Even in the case of the perspective control lens system of the related art, an area outside a normal image circle has to be used during tilting as compared with a normal use condition. It is necessary to compensate aberration sufficiently in the image circle which is larger than the size of the image pickup surface. Hence, the image quality may deteriorate during tilting. In the configuration of the tilt lens system 2 of the embodiment of the invention shown in FIG. 1, the angle of view of the master lens system 200 to the object is hardly changed during tilting. The image circle does not have to be extended, and therefore, the master lens system 200 can properly compensate aberration and the front lens system thereof can be reduced in size.

Conditional Expression (1) is to efficiently provide the effect of tilting as described with reference to FIG. 1. If the value is below the lower limit, a tilt angle θ3 of the object is not sufficient although a tilt angle θ1 is increased. Increasing the tilt angle θ3 may cause the path of a ray passing through the tilt lens unit 290 to become markedly different from that in the coaxial optical system condition. However, it is difficult to keep the balance of the aberration compensation. If the value is above the upper limit, a large object tilt angle θ3 can be obtained with a small tilt angle θ1. It is difficult to decrease the F-number of the entire system to increase the brightness. In particular, the refractive power arrangement of the tilt lens system of the embodiment of the invention is such that a rear conversion lens is added to a master lens system of which aberration is properly corrected. Accordingly, the F-number of the master lens system 200 is increased by the tilt lens unit 290 such as the rear conversion lens, and thus, the F-number of the entire system is determined. The F-number of the entire system may be, for example, about F4, as a practical product. If βt=1.4, the F-number of the master lens system is F2.8. Designing is started with the combination of a rear conversion lens with a magnification of ×1.4 to a macro lens with F2.8. If βt=1.7, the F-number of the master lens system becomes F2.35. An extremely bright ray is incident on the tilt lens system. Unfortunately, even with the rear conversion lens, it is more difficult to compensate the aberration as the magnification is larger. There is no solution to keep the balance of the aberration compensation during tilting.

Conditional Expression (2) relates to a mechanical structure to sufficiently tilt the tilt lens unit 290 at a desired azimuth, and the balance of the aberration compensation during tilting, when the tilt lens system 2 is used as an interchangeable lens of a single-lens reflex camera. Japanese Unexamined Patent Application Publication No. 4-243212 and No. 4-243207 suggest that the position of the center of rotation of the tilt lens unit should be determined under, the condition where the center image is not moved. In the embodiment of the invention, the position of the center of rotation is determined under the condition of an aberration variation during tilting and the condition of securing a space in the interchangeable lens for installing the tilt mechanism. If the value is above the upper limit, the center of rotation may come close to or may be superposed on a flange surface of the interchangeable lens. It is difficult to arrange the tilt mechanism at a desired azimuth. If the value is below the lower limit, an astigmatic difference between a meridional surface and a sagittal surface is likely generated on the plus side and the minus side of the image height.

In the tilt lens system according to the embodiment of the invention, the tilt lens unit may include a positive lens unit, a negative lens unit, a negative lens unit, and a positive lens unit, in order from an object side, and the tilt lens unit may satisfy Conditional Expressions (3) and (4) as follows:

$$1.25 < |ft1/ft2| < 1.9 \quad (3)$$

$$0.3 < |ft3/ft4| < 0.85 \quad (4)$$

where fti is a focal length of an i-th lens unit from the object side in the tilt lens unit.

Figure 2:
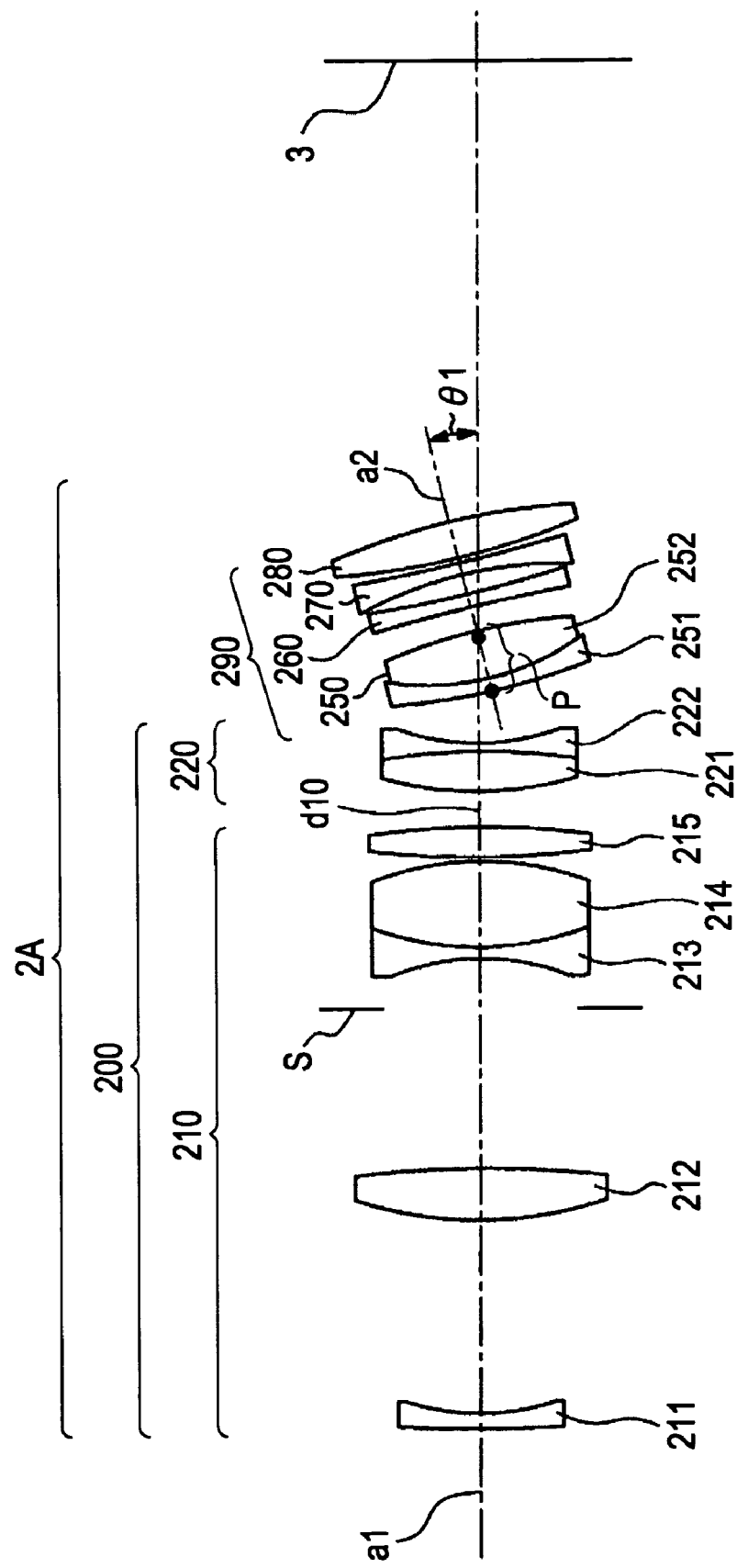
FIG. 2 is a cross section showing a lens arrangement of a tilt lens system according to a first embodiment of the invention.

An example implementing the embodiment may be a configuration in FIG. 2. The tilt lens unit 290 has a refractive power arrangement including a positive lens unit 250, a negative lens unit 260, a negative lens unit 270, and a positive lens unit 280, in order from the object side.

With this configuration, the tilt lens unit 290 has a configuration of, for example, a teleconversion lens, which is added on the object side of the master lens system. Thus, merely the tilt lens unit 290 can sufficiently compensate the aberration. In the case where the tilt lens unit 290 has the configuration in FIG. 2, if the value is below the lower limit of Conditional Expression (2), the negative lens unit 270 and the positive lens unit 280 may be apart from the center of rotation, and hence, the two lens units 270 and 280 significantly affecting the image plane characteristic may be moved markedly. Accordingly, an astigmatic difference between a meridional surface and a sagittal surface is likely generated on the plus side and the minus side of the image height.

Conditional Expression (3) relates to a coma at the center of the screen during tilting. A spherical aberration at the surface of the positive lens unit 250 nearest to the image side cancels a spherical aberration at the surface of the negative lens unit 260 near the object side, thereby compensating the spherical aberration in the coaxial optical system. As shown in FIG. 2, if the tilt lens unit 290 is rotated counterclockwise in the drawing, an upper portion of the ray directed to the center of the screen may be markedly bent downward at the positive lens unit 250, and then, may be markedly bent upward at the negative lens unit 260 for the cancellation when passing through the above-mentioned two surfaces. If the value is below the lower limit of Conditional Expression (3), the coma toward the lower side may be increased. If the value is above the upper limit, the coma toward the upper side may become noticeable. In either case, it is difficult to compensate the coma.

Conditional Expression (4) relates to the image plane characteristic for the tilted object during tilting. If the value is outside the range defined by Conditional Expression (4), an astigmatic difference between a meridional surface and a sagittal surface may become noticeable on the minus side of the image height when the tilt lens unit 290 is tilted counterclockwise as shown in FIG. 2. The compensation may be difficult.

In the tilt lens system according to the embodiment of the invention, the positive lens unit located nearest to the object side in the tilt lens unit may include a negative lens having a concave surface with a larger curvature on the image side, and a positive lens having a convex surface with a larger curvature on the object side, in order from the object side. The surfaces of the two lenses of the positive lens unit facing each other may have extremely approximate curvatures, or the two lenses may be cemented. Also, Conditional Expression (5) may be satisfied as follows:

$$(nt11-nt12)>0.17 \quad (5)$$

where nt11 is a refractive index of the negative lens in the positive lens unit, and nt12 is a refractive index of the positive lens in the positive lens unit.

Accordingly, the image plane characteristic can be properly obtained during tilting.

Conditional Expression (5) provides a proper Petzval sum, to facilitate the compensation of the image plane, and relates to the balance between the Petzval sums of the master lens system 200 and the tilt lens unit 290. To control the Petzval sums in the entire system to be proper values, there would be no problem in the coaxial optical system although the Petzval sum of the master lens system 200 is markedly tilted to the plus side whereas the Petzval sum of the tilt lens unit 290 markedly inclines to the minus side. However, if the tilt lens unit 290 is tilted while having a Petzval sum markedly inclining to the minus side, the image plane compensation characteristic of the tilt lens unit 290 may deteriorate. This may cause an astigmatic difference during tilting. Therefore, it is desired that the positive lens unit located nearest to the object side in the tilt lens unit 290 includes the negative lens having the concave surface with the larger curvature on the image side, and the positive lens having the convex surface with the larger curvature on the object side, in order from the object side, to obtain a large difference between the refractive indices of the two lenses and control the Petzval sum to a proper value, in a manner similar to the rear conversion lens even if the lens system is not independently provided unlike the rear conversion lens.

In the tilt lens system according to the embodiment of the invention, the negative lens unit, which is the second unit from the object side in the tilt lens unit, may include a positive lens having a convex surface with a larger curvature on the image side, and a negative lens having a concave surface with a larger curvature on the object side, in order from the object side. The surfaces of the two lenses of the negative lens unit facing each other may have extremely approximate curvatures, or the two lenses may be cemented. Also, Conditional Expression (6) may be satisfied as follows:

$$(nt21-nt22)<-0.1 \quad (6)$$

where nt21 is a refractive index of the positive lens in the negative lens unit, and nt22 is a refractive index of the negative lens in the negative lens unit.

Accordingly, the coma generated at the center of the screen during tilting can be reduced, and the tilt angle can be increased while the proper aberration compensation is kept.

To reduce the coma generated at the center of the screen during tilting, it is desired that the most object side surface in the negative lens unit, which is the second unit from the object side in the tilt lens unit, is a convex surface with a smaller curvature. To attain this, Conditional Expression (6) should be satisfied so that a negative refractive power is distributed to the image-side surface of the positive lens and the object-side surface of the negative lens (or the cemented surface when the two lenses are cemented).

In the tilt lens system according to the embodiment of the invention, the positive lens unit located nearest to the object side in the tilt lens unit may include a negative lens having a concave surface with a larger curvature on the image side, a biconvex lens, and a negative lens having a concave surface on the object side, in order from the object side. The surfaces of the three lenses of the positive lens unit facing each other may have extremely approximate curvatures, or the three lenses may be cemented. Also, Conditional Expressions (5) and (7) may be satisfied as follows:

$$(nt11-nt12)>0.17 \quad (5)$$

$$(nt12-nt13)<-0.07 \quad (7)$$

where nt11 is a refractive index of the negative lens on the object side in the positive lens unit, nt12 is a refractive index of the biconvex lens in the positive lens unit, and nt13 is a refractive index of the negative lens on the image side in the positive lens unit.

Accordingly, the coma generated at the center of the screen during tilting can be further properly compensated. Thus, during tilting, the coma can be properly compensated to a degree similar to that of the spherical aberration in the coaxial optical system.

By satisfying Conditional Expression (7), the biconvex lens in the positive lens unit located nearest to the object side in the tilt lens unit, and the object-side surface of the image-side negative lens (or the image-side cemented surface if the positive lens unit is the three cemented lenses) may have negative refractive powers. The positive lens unit can have an effect of canceling the coma toward the lower side generated at the exit surface of the positive lens unit by generating the coma toward the upper side at the surface in front of the exit surface (the image-side surface of the biconvex lens and the object-side surface of the image-side negative lens (or the image-side cemented surface when the positive lens unit is the three cemented lenses)).

In the tilt lens system according to the embodiment of the invention, the positive lens unit located nearest to the object side in the tilt lens unit may include a negative lens having a concave surface with a larger curvature on the image side, a biconvex lens, and a negative lens having a concave surface on the object side, in order from the object side. The surfaces of the three lenses of the positive lens unit facing each other may have extremely approximate curvatures, or the three lenses may be cemented. Also, Conditional Expressions (5) and (8) may be satisfied as follows:

$$(nt11-nt12)>0.17 \tag{5}$$

$$(nt12-nt13)>0.02 \tag{8}$$

where $nt11$ is a refractive index of the negative lens on the object side in the positive lens unit, $nt12$ is a refractive index of the biconvex lens in the positive lens unit, and $nt13$ is a refractive index of the negative lens on the image side in the positive lens unit.

Accordingly, the coma generated at the center of the screen during tilting can be further properly compensated. Thus, during tilting, the coma can be properly compensated to a degree similar to that of the spherical aberration in the coaxial optical system.

By satisfying Conditional Expression (8), the image-side surface of the biconvex lens, and the object-side surface of the image-side negative lens in the positive lens unit located nearest to the object side in the tilt lens unit (or the image-side cemented surface if the positive lens unit is the three cemented lenses) have positive refractive powers. The positive refractive powers are diverged into the subsequently arranged exit surface; thereby the above-mentioned effect can be obtained.

In the tilt lens system according to the embodiment of the invention, a fixed lens unit may be arranged between the focus lens unit and the tilt lens unit. The fixed lens unit is fixed relative to the image pickup surface during focusing.

Since the fixed lens unit is arranged between the focus lens unit and the tilt lens unit, a variation in aberration can be reduced by using the change of the path of the ray during focusing. That is, a variation in aberration due to a change in distance during focusing can be reduced. The fixed lens unit has a function of compensating a close range aberration, with either a large magnification or a small magnification.

In the tilt lens system according to the embodiment of the invention, the fixed lens unit may include a cemented lens composed of a positive lens and a negative lens, arranged in order from the object side. Also, Conditional Expression (9) may be satisfied as follows:

$$0.5<\beta f<1.2 \tag{9}$$

where $\beta f$ is a lateral magnification of the fixed lens unit.

If the value is below the lower limit of Conditional Expression (9), aberrations caused by the focus lens unit are reduced, thereby being advantageous to the aberration compensation in the entire system. However, the total length and the extending amount during focusing become too large, degrading the usability. If the value is above the upper limit, such a situation is advantageous to a reduction in size. However, aberrations caused by the focus lens unit are enlarged by the fixed lens unit, and then are enlarged by the tilt lens unit. It is difficult to obtain a desired focusing property.

In the tilt lens system according to the embodiment of the invention, the focus lens unit may include a negative lens having a concave surface with a larger curvature on the image side, a first biconvex lens, a diaphragm, a negative lens having a concave surface on the object side, a second biconvex lens, and a positive lens having a convex lens with a larger curvature on the image side, in order from the object side. Also, Conditional Expression (10) may be satisfied as follows:

$$1.25<h2/h1<1.6 \tag{10}$$

where $h1$ is a paraxial ray height of a ray incident in parallel to the optical axis, and $h2$ is a paraxial ray height of a ray when exiting from the first biconvex lens, which is measured with respect to $h1$.

Accordingly, a large back focal length that allows the tilt lens unit to be arranged on the image side can be obtained, and a variation in aberration due to a change in distance can be reduced through a relative effect with the fixed lens unit.

This embodiment determines a more specific configuration of the focus lens unit. In many cases, a macro lens employs a Gauss type or a modification type of the Gauss type. In the tilt lens system of the embodiment of the invention, the focus lens unit may be a retrofocus type to extend the back focal length, so as to arrange the tilt lens system, which has a large number of lenses, on the image side. The large number of lenses is used in the tilt lens unit, and the two lenses are used in the fixed lens unit. Thus, it is important that the focus lens unit employs a retrofocus lens, which is simple, and has the least number of lenses, so as to reduce absorption or reflection of light.

If the value is below the lower limit of Conditional Expression (10), the focus lens unit would not obtain a sufficient back focal length. It is difficult to arrange the tilt lens unit. If the value is above the upper limit, the Petzval sum tends to be tilted to the minus side. It is difficult to compensate the field curvature.

Next, specific embodiments implementing the tilt lens system of the invention are described.

FIG. 2 is a cross section showing a lens arrangement of a tilt lens system 2A according to a first embodiment of the invention. The tilt lens system 2A includes a master lens system 200, and a tilt lens unit 290, in order from the object side. The master lens system 200 has an optical axis (primary optical axis) a1. The tilt lens unit 290 has a negative refractive power, and has an optical axis a2. The optical axis a2 of the tilt lens unit 290 may be tilted with respect to the optical axis a1 of the master lens system 200. When the optical axis a2 of the tilt lens unit 290 is not tilted, the optical axis a2 is aligned with the optical axis a1 of the master lens system 200, thereby defining a coaxial optical system. The master lens system 200 includes a focus lens unit 210 and a fixed lens unit 220, in order from the object side.

The focus lens unit 210 includes a negative meniscus lens 211 having a concave surface with a larger curvature on the image side, a biconvex lens 212, a diaphragm S, a negative cemented lens composed of a biconcave lens 213 having a concave surface on the object side and a biconvex lens 214, and a biconvex lens 215 having a convex surface with a larger curvature on the image side, in order from the object side. The fixed lens unit 220 includes a positive cemented lens composed of a biconvex lens 221 and a biconcave lens 222, in order from the object side.

The tilt lens unit 290 includes a positive lens unit 250, a negative lens unit 260, a negative lens unit 270, and a positive lens unit 280, in order from the object side. The positive lens unit 250 includes a positive cemented lens composed of a negative meniscus lens 251 having a concave surface with a larger curvature on the image side, and a biconvex lens 252 having a convex surface with a larger curvature on the object side. The negative lens unit 260 includes a biconcave lens. The negative lens unit 270 includes a biconcave lens. The positive lens unit 280 includes a biconvex lens.

Table 1 shows data of each optical element, that is, a curvature radius r, a surface distance d, a refractive index nd, and an Abbe number vd, according to Numerical Example 1 in which specific numerical values are applied to a configuration 1A of the first embodiment, in the case of the coaxial optical system, or in the case where a tilt angle $\theta1=0$, the tilt angle $\theta1$ representing a tilt angle of the optical axis a2 of the tilt lens unit 290 with respect to the primary optical axis a1. The surface number i represents an i-th surface from the object side, the surface distance d represents an axial surface distance between the i-th surface and the (i+1)-th surface, and the refractive index nd and the Abbe number vd are based on the d-line (wavelength $\lambda=587.6$ nanometer (nm)).

TABLE 1

| Optical element | Surface number i | Curvature radius r | Surface distance d | Refractive index nd | Abbe number vd |
| --- | --- | --- | --- | --- | --- |
| 211 | 1 | 105.511 | 1.419 | 1.80420 | 46.5 |
|  | 2 | 22.989 | 18.881 | 1. |  |
| 212 | 3 | 37.877 | 5.000 | 1.83481 | 42.7 |
|  | 4 | −102.795 | 15.545 | 1. |  |
| Diaphragm | 5 | ∞ | 4.836 | 1. |  |
| 213 | 6 | −24.951 | 1.290 | 1.84666 | 23.8 |
| 214 | 7 | 32.005 | 8.397 | 1.51742 | 52.2 |
|  | 8 | −25.195 | 0.200 | 1. |  |
| 215 | 9 | 87.854 | 3.020 | 1.90366 | 31.3 |
|  | 10 | −67.646 | Variable | 1. |  |
| 221 | 11 | 32.160 | 3.769 | 1.84666 | 23.8 |
| 222 | 12 | −85.718 | 0.900 | 1.80518 | 25.5 |
|  | 13 | 24.613 | 5.000 | 1. |  |
| 251 | 14 | 80.000 | 1.216 | 1.83481 | 42.7 |
| 252 | 15 | 23.022 | 4.685 | 1.58144 | 40.9 |
|  | 16 | −59.586 | 2.415 | 1. |  |
| 260 | 17 | −120.001 | 1.200 | 1.77250 | 49.6 |
|  | 18 | 120.001 | 2.047 | 1. |  |
| 270 | 19 | −37.102 | 1.200 | 1.77250 | 49.6 |
|  | 20 | 272.653 | 0.500 | 1. |  |
| 280 | 21 | 70.026 | 3.500 | 1.62041 | 60.3 |
|  | 22 | −70.026 | 44.578 | 1. |  |
| Image pickup surface | 23 | ∞ |  |  |  |

Table 2 shows a focal length, an F-number, an angle of view ($2\omega$), a maximum image height, a lateral magnification, a distance from an object to the first surface, and a variable distance (d10=distance between the focus lens unit 210 and the fixed lens unit 220), in Numerical Example 1.

TABLE 2

| Focal length | 60.07 | | |
| --- | --- | --- | --- |
| F-number | 4.08 | | |
| $2\omega$ (deg) | 26.7 | | |
| Maximum image height | 14.2 | | |
| Lateral magnification | 0 | −0.1 | −0.5 |
| Object to 1st surface | ∞ | 594.8 | 117.5 |
| d 10 | 1.000 | 3.453 | 13.198 |

Table 3 shows the optimum object tilt angle $\theta3$, when the tilt angle $\theta1$ is 13 degrees, in Numerical Example 1.

TABLE 3

| Optimum object tilt angle $\theta3$ when $\theta1$ = 13 degrees | | |
| --- | --- | --- |
| | d 10 | |
| | 3.453 | 13.198 |
| $\theta3$ (deg) | 39 | 10 |

Figure 3:
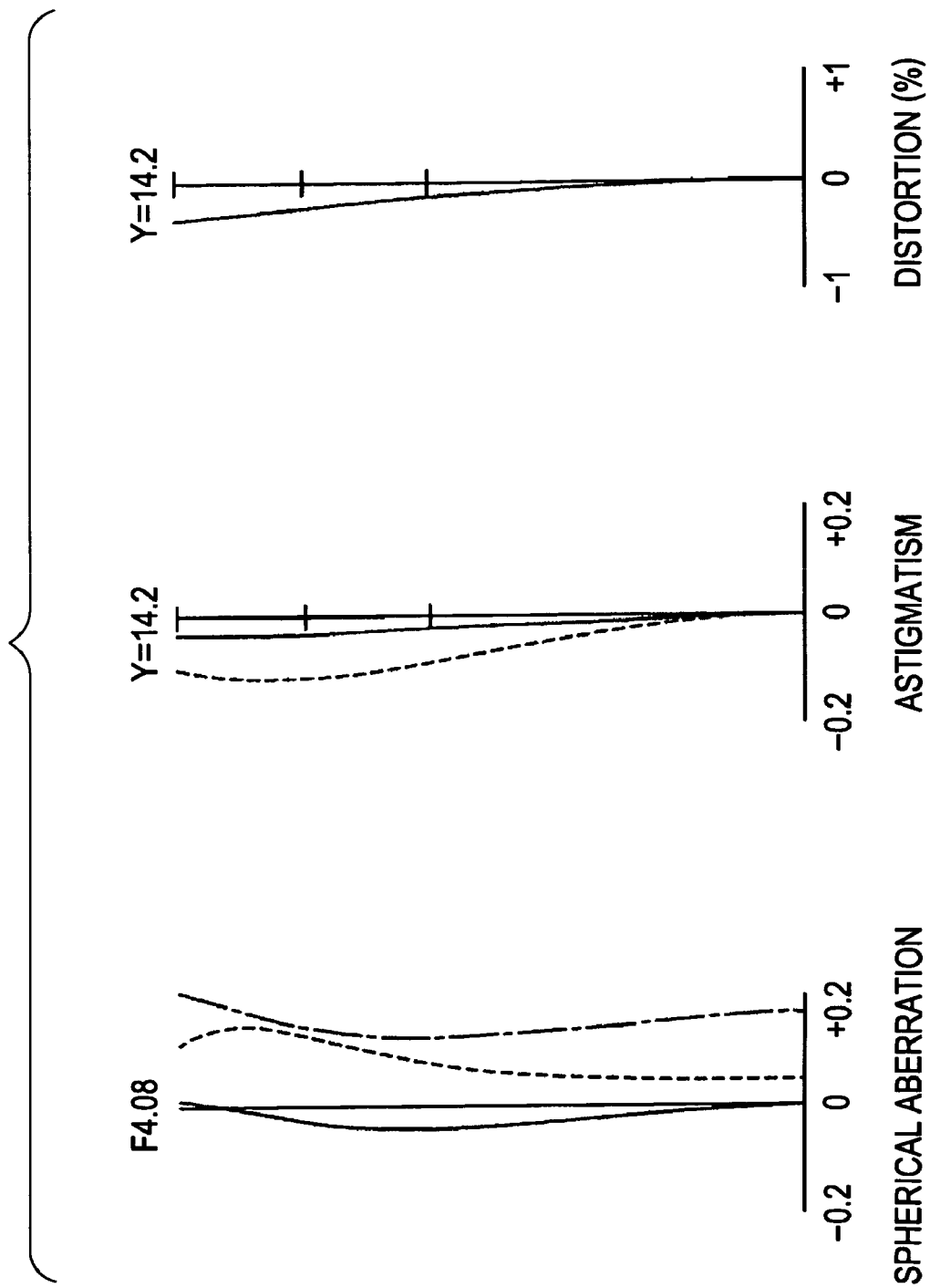
FIG. 3 illustrates aberration diagrams for a spherical aberration, an astigmatism, and a distortion in a coaxial optical system when a lateral magnification is zero, FIGS. 4 to 7 (described later) illustrating aberration diagrams of Numerical Example 1 in which specific numerical values are applied to the first embodiment.
Figure 4:
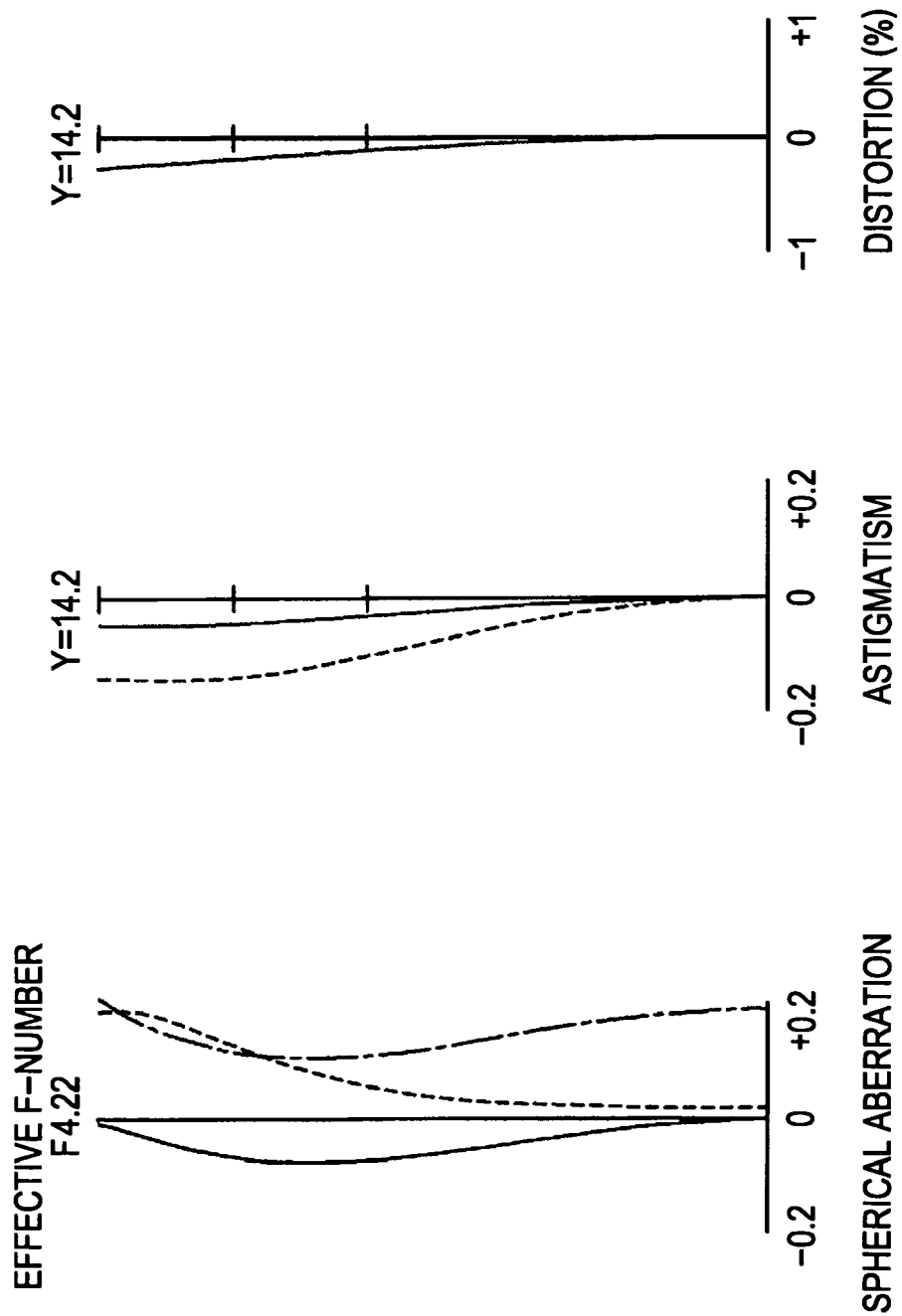
FIG. 4 illustrates aberration diagrams for a spherical aberration, an astigmatism, and a distortion in the coaxial optical system when a lateral magnification is −0.1.
Figure 5:
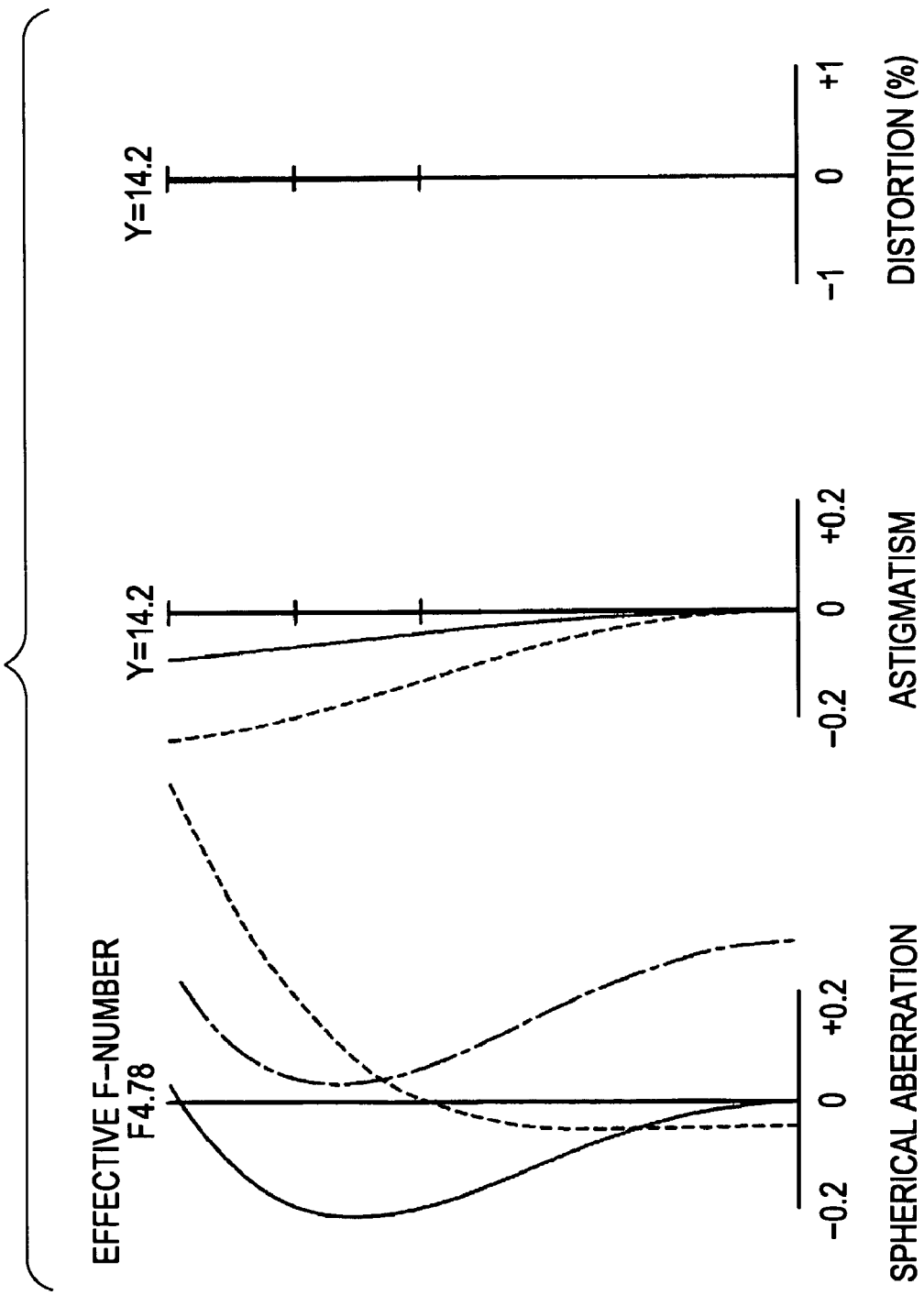
FIG. 5 illustrates aberration diagrams for a spherical aberration, an astigmatism, and a distortion in the coaxial optical system when a lateral magnification is −0.5.
Figure 6:
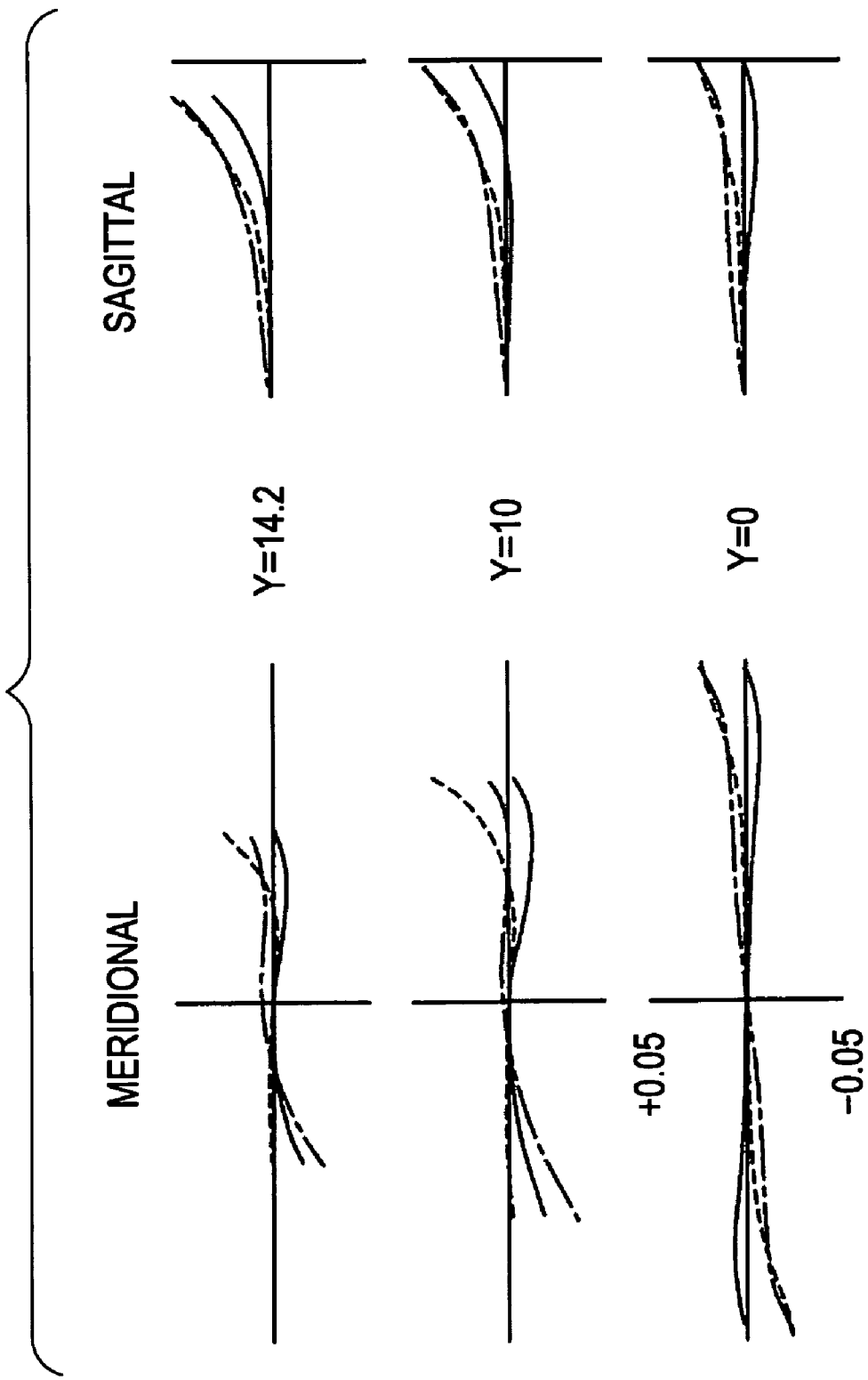
FIG. 6 illustrates aberration diagrams showing lateral aberrations in the coaxial optical system at a limited distance.
Figure 7:
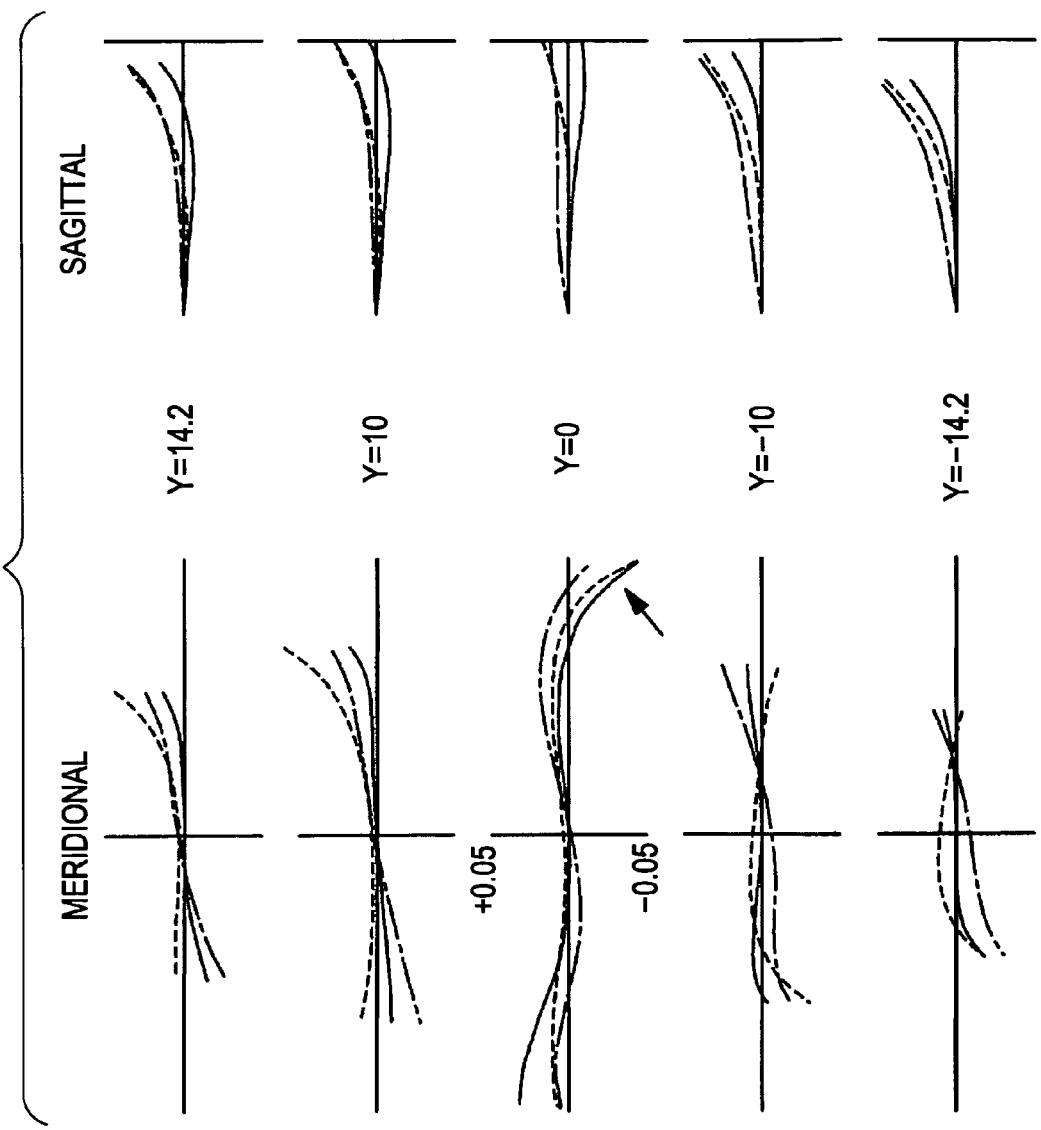
FIG. 7 illustrates aberration diagrams showing lateral aberrations when a tilt lens unit and an object plane are tilted at the same lens position as FIG. 6.

Each of FIGS. 3 to 5 shows a spherical aberration, a field curvature, and a distortion, when $\theta1=0$, in Numerical Example 1, with a lateral magnification of 0 in FIG. 3, −0.1 in FIG. 4, or −0.5 in FIG. 5. Each of FIGS. 6 and 7 shows lateral aberration curves at a meridional surface and a sagittal surface when d10=3.453, with $\theta1=0$ degree in FIG. 6, and $\theta1=13$ degrees and $\theta3=39$ degrees in FIG. 7.

In the spherical aberration curve and the lateral aberration curve of each aberration diagram, solid lines show values based on the d-line, broken lines show values based on the g-line ($\lambda=435.8$ nm), and dotted-chain lines show values based on the C-line ($\lambda=656.3$ nm). In astigmatism curves, a solid line represents a sagittal image plane, and a broken line represents a meridional image plane.

Figure 8:
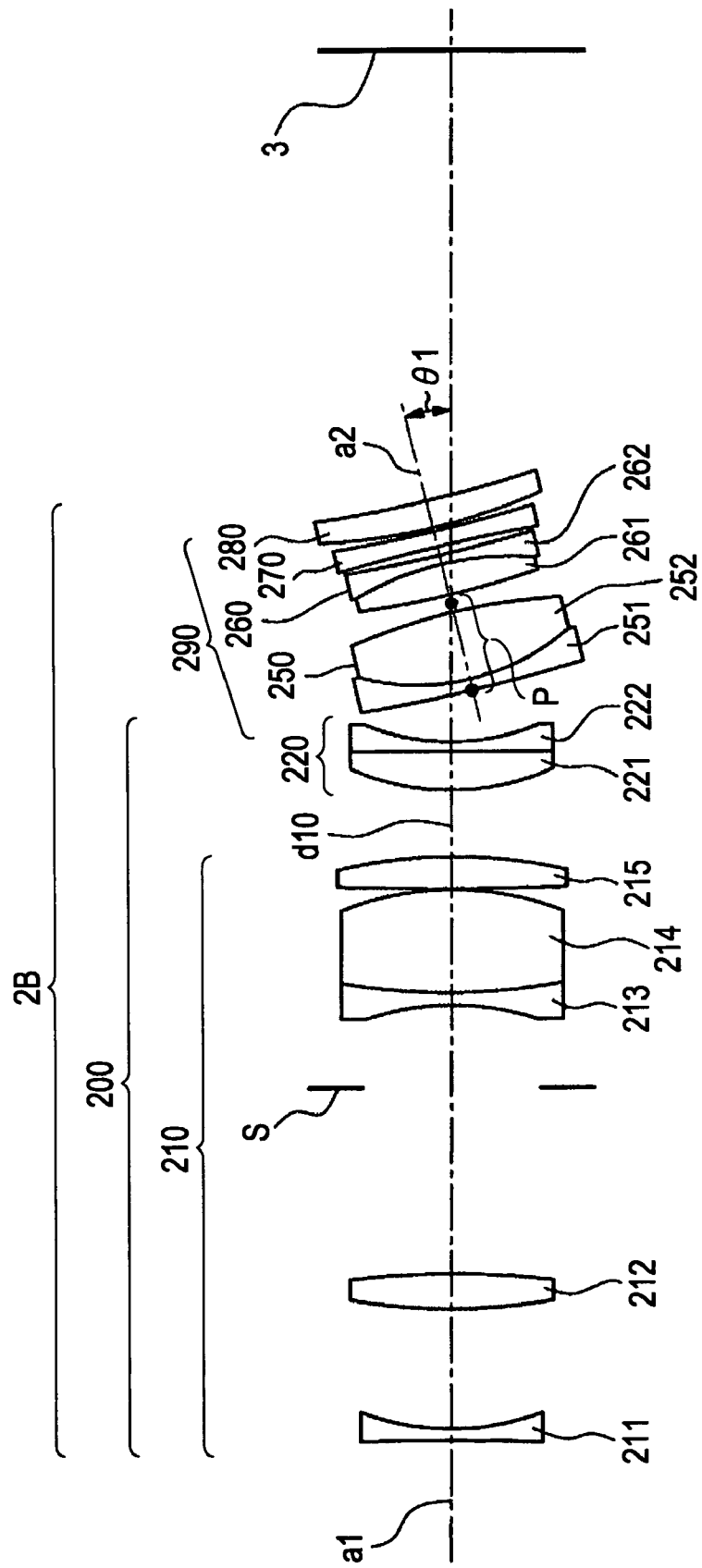
FIG. 8 is a cross section showing a lens arrangement of a tilt lens system according to a second embodiment of the invention.

FIG. 8 is a cross section showing a lens arrangement of a tilt lens system 2B according to a second embodiment of the invention. The master lens system 200 has an optical axis (primary optical axis) a1. The tilt lens system 2B includes a master lens system 200, and a tilt lens unit 290, in order from the object side. The tilt lens unit 290 has a negative refractive power, and has an optical axis a2. The optical axis a2 of the tilt lens unit 290 may be tilted with respect to the optical axis a1 of the master lens system 200. When the optical axis a2 of the tilt lens unit 290 is not tilted, the optical axis a2 is aligned with the optical axis a1 of the master lens system 200, thereby defining a coaxial optical system. The master lens system 200 includes a focus lens unit 210 and a fixed lens unit 220, in order from the object side.

The focus lens unit 210 includes a negative meniscus lens 211 having a concave surface with a larger curvature on the image side, a biconvex lens 212, a diaphragm S, a negative cemented lens composed of a biconcave lens 213 having a concave surface on the object side and a biconvex lens 214, and a biconvex lens 215 having a convex surface with a larger curvature on the image side, in order from the object side. The fixed lens unit 220 includes a negative cemented lens composed of a biconvex lens 221 and a biconcave lens 222, in order from the object side.

The tilt lens unit 290 includes a positive lens unit 250, a negative lens unit 260, a negative lens unit 270, and a positive lens unit 280, in order from the object side. The positive lens unit 250 includes a positive cemented lens composed of a negative meniscus lens 251 having a concave surface with a larger curvature on the image side, and a biconvex lens 252 having a convex surface with a larger curvature on the object side. The negative lens unit 260 includes a negative cemented lens composed of a biconvex lens 261 having a convex surface with a larger curvature on the image side, and a biconcave lens 262 having a concave surface with a larger curvature on the object side. The negative lens unit 270 includes a biconcave lens. The positive lens unit 280 includes a positive meniscus lens having a convex surface with a larger curvature on the object side.

Table 4 shows data of each optical element, that is, a curvature radius r, a surface distance d, a refractive index nd, and an Abbe number vd, according to Numerical Example 2 in which specific numerical values are applied to a configuration 1B of the second embodiment, in the case of the coaxial optical system, or in the case where a tilt angle θ1=0, the tilt angle θ1 representing a tilt angle of the optical axis a2 of the tilt lens unit 290 with respect to the primary optical axis a1. The surface number i represents an i-th surface from the object side, the surface distance d represents an axial surface distance between the i-th surface and the (i+1)-th surface, and the refractive index nd and the Abbe number vd are based on the d-line.

TABLE 4

| Optical element | Surface number i | Curvature radius r | Surface distance d | Refractive index nd | Abbe number vd |
|---|---|---|---|---|---|
| 211 | 1 | −487.139 | 1.419 | 1.83481 | 42.7 |
|  | 2 | 29.473 | 12.830 | 1. |  |
| 212 | 3 | 53.775 | 3.800 | 1.83400 | 37.3 |
|  | 4 | −73.478 | 20.040 | 1. |  |
| Diaphragm | 5 | ∞ | 9.000 | 1. |  |
| 213 | 6 | −28.607 | 1.290 | 1.84666 | 23.8 |
| 214 | 7 | 64.741 | 11.000 | 1.48749 | 70.4 |
|  | 8 | −30.535 | 0.200 | 1. |  |
| 215 | 9 | 410.431 | 3.357 | 1.90366 | 31.3 |
|  | 10 | −53.519 | Variable | 1. |  |
| 221 | 11 | 27.456 | 4.073 | 1.90366 | 31.3 |
| 222 | 12 | ∞ | 0.900 | 1.78472 | 25.7 |
|  | 13 | 25.000 | 5.300 | 1. |  |
| 251 | 14 | 85.165 | 1.200 | 1.88300 | 40.8 |
| 252 | 15 | 21.152 | 7.500 | 1.62004 | 36.3 |
|  | 16 | −98.126 | 1.839 | 1. |  |
| 261 | 17 | 179.755 | 3.537 | 1.71736 | 29.5 |
| 262 | 18 | −35.462 | 1.200 | 1.88300 | 40.8 |
|  | 19 | 165.604 | 1.144 | 1. |  |
| 270 | 20 | −113.231 | 1.200 | 1.90366 | 31.3 |
|  | 21 | 113.231 | 0.324 | 1. |  |
| 280 | 22 | 47.726 | 3.005 | 1.49700 | 81.6 |
|  | 23 | 156.071 | 48.156 | 1. |  |
| Image pickup surface | 24 | ∞ |  |  |  |

Table 5 shows a focal length, an F-number, an angle of view (2ω), a maximum image height, a lateral magnification, a distance from an object to the first surface, and a variable distance (d10=distance between the focus lens unit 210 and the fixed lens unit 220), in Numerical Example 2.

TABLE 5

| Focal length | 60.05 | | |
| F-number | 4.08 | | |
| 2ω (deg) | 26.8 | | |
| Maximum image height | 14.2 | | |
| Lateral magnification | 0 | −0.1 | −0.5 |

TABLE 5-continued

| Object to 1st surface | ∞ | 605.5 | 125.5 |
| d 10 | 1.738 | 7.448 | 30.292 |

Table 6 shows the optimum object tilt angle θ3 when the tilt angle θ1 is 15 degrees, in Numerical Example 2.

TABLE 6

| Optimum object tilt angle θ3 when θ1 = 15 degrees | | |
|---|---|---|
| | d 10 | |
| | 7.448 | 30.292 |
| θ3 (deg) | 49 | 14 |

Figure 9:
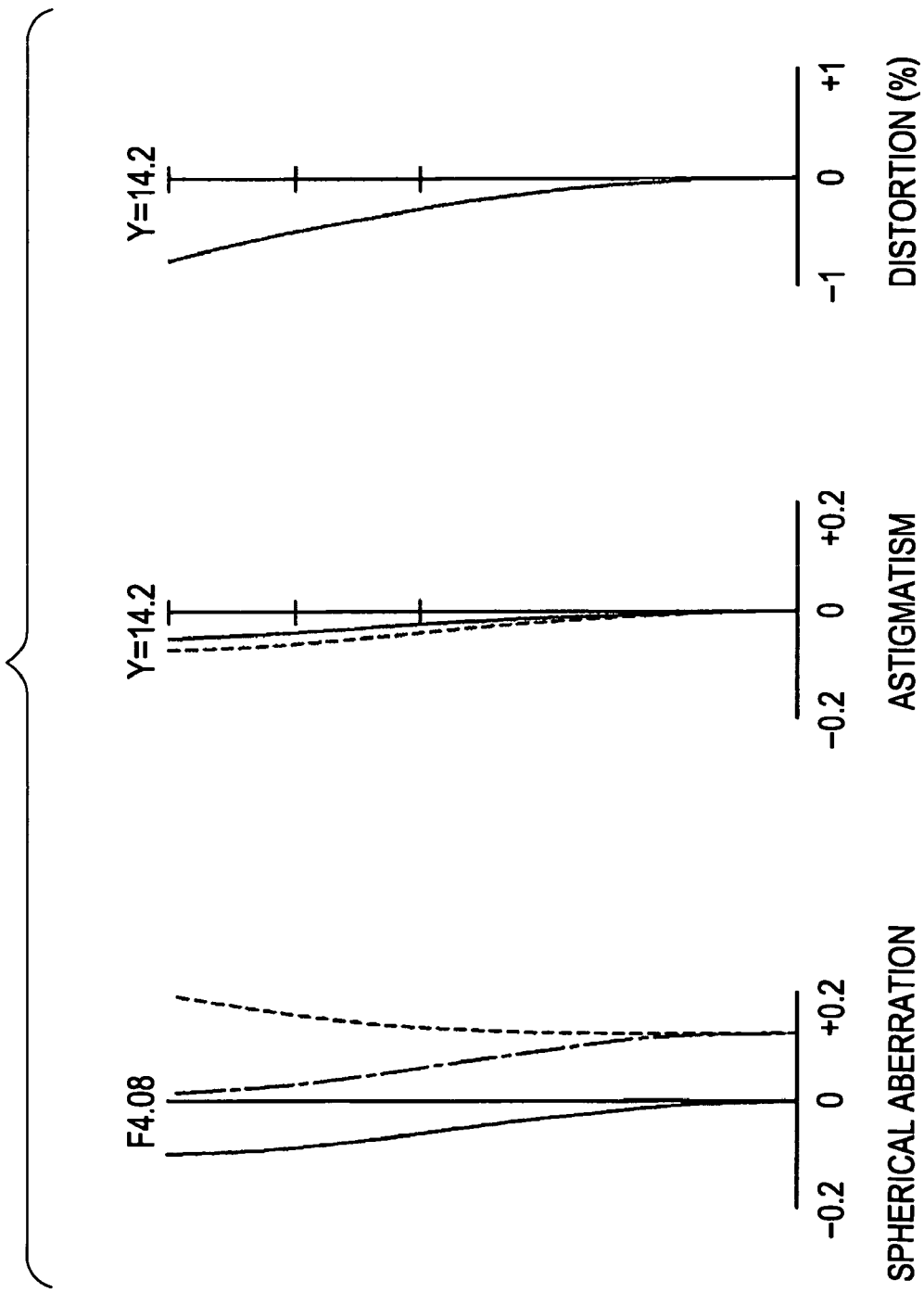
FIG. 9 illustrates aberration diagrams for a spherical aberration, an astigmatism, and a distortion in a coaxial optical system when a lateral magnification is zero, FIGS. 10 to 13 (described later) illustrating aberration diagrams of Numerical Example 2 in which specific numerical values are applied to the second embodiment.
Figure 10:
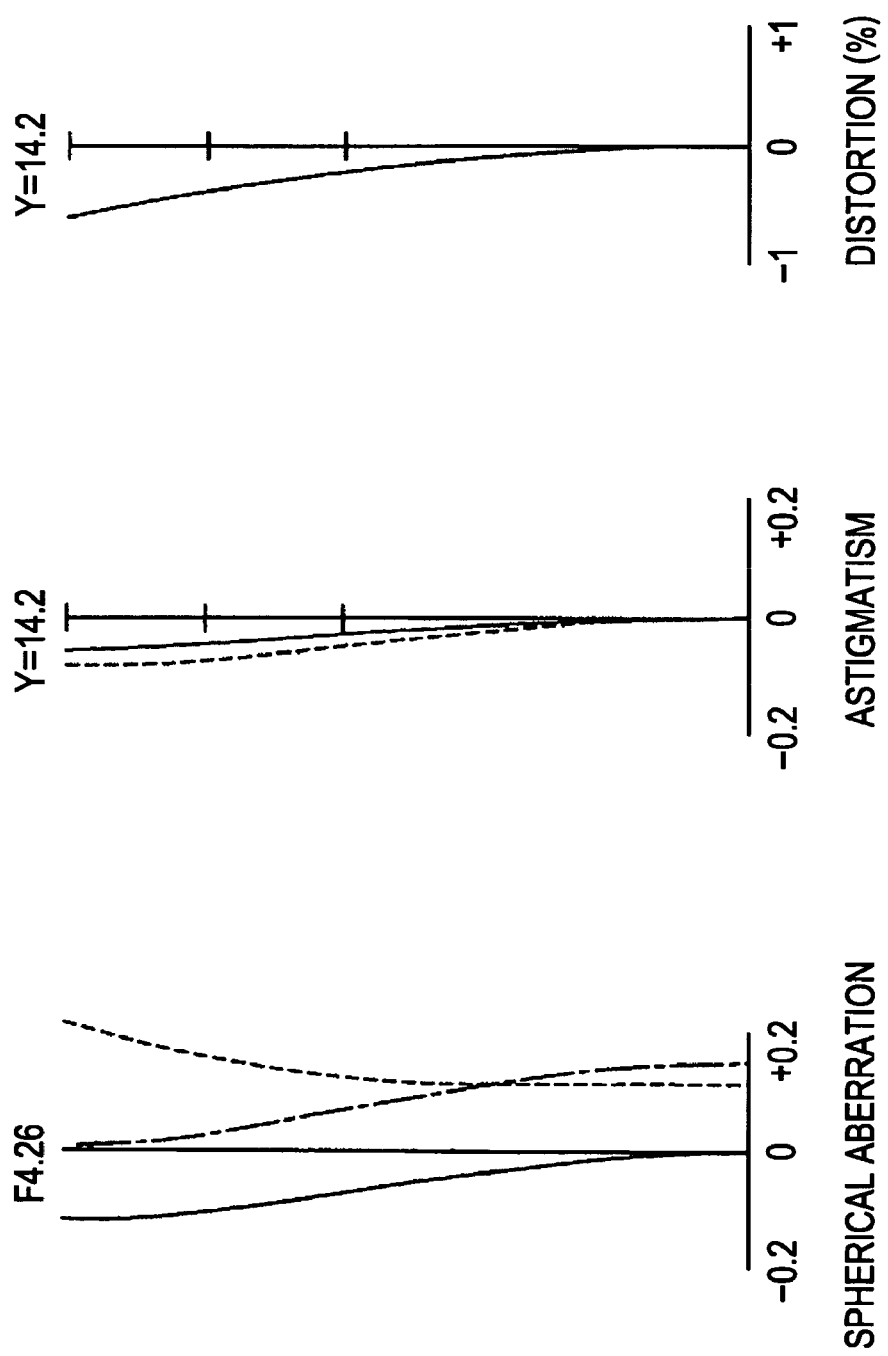
FIG. 10 illustrates aberration diagrams for a spherical aberration, an astigmatism, and a distortion in the coaxial optical system when a lateral magnification is −0.1.
Figure 11:
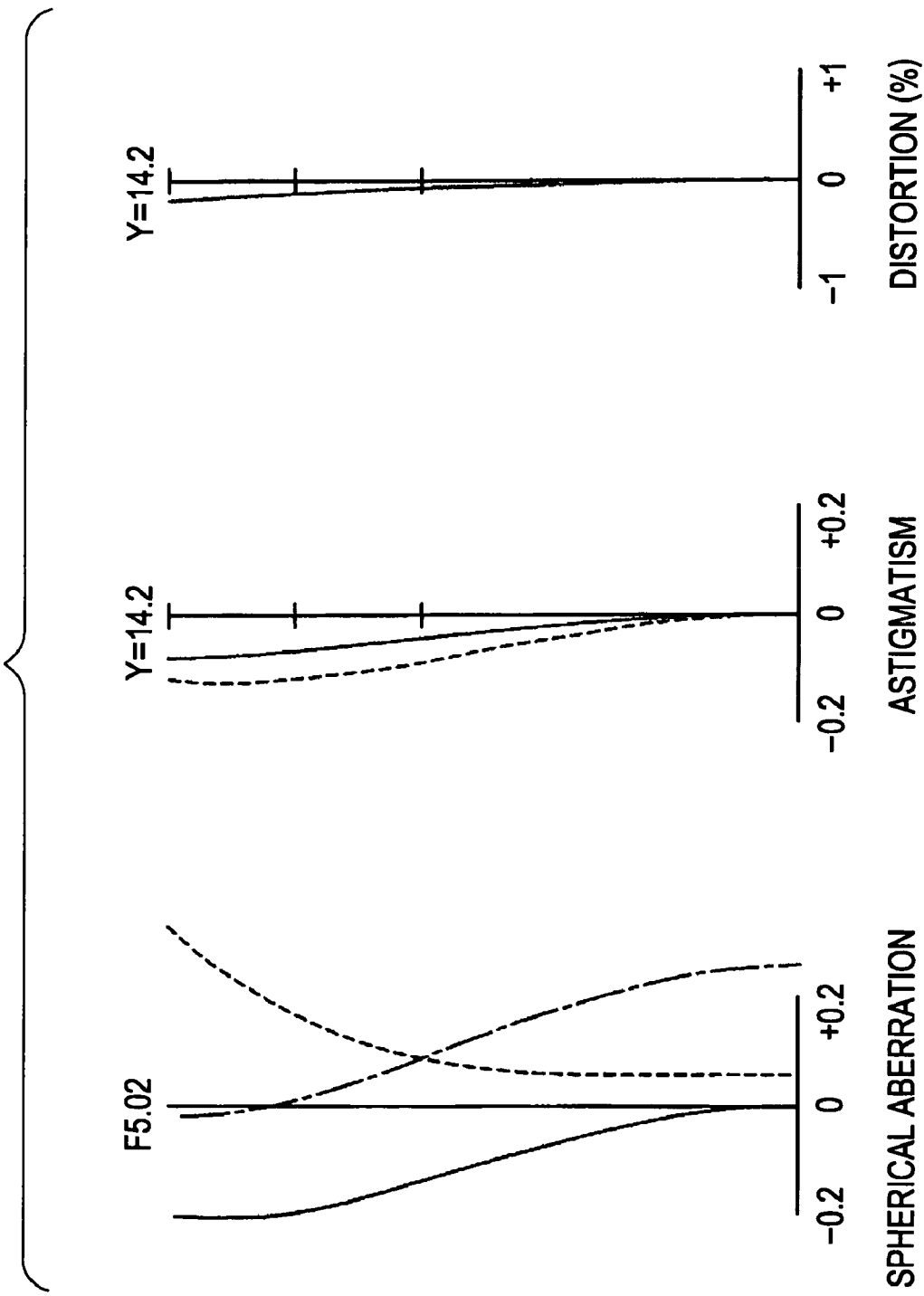
FIG. 11 illustrates aberration diagrams for a spherical aberration, an astigmatism, and a distortion in the coaxial optical system when a lateral magnification is −0.5.
Figure 12:
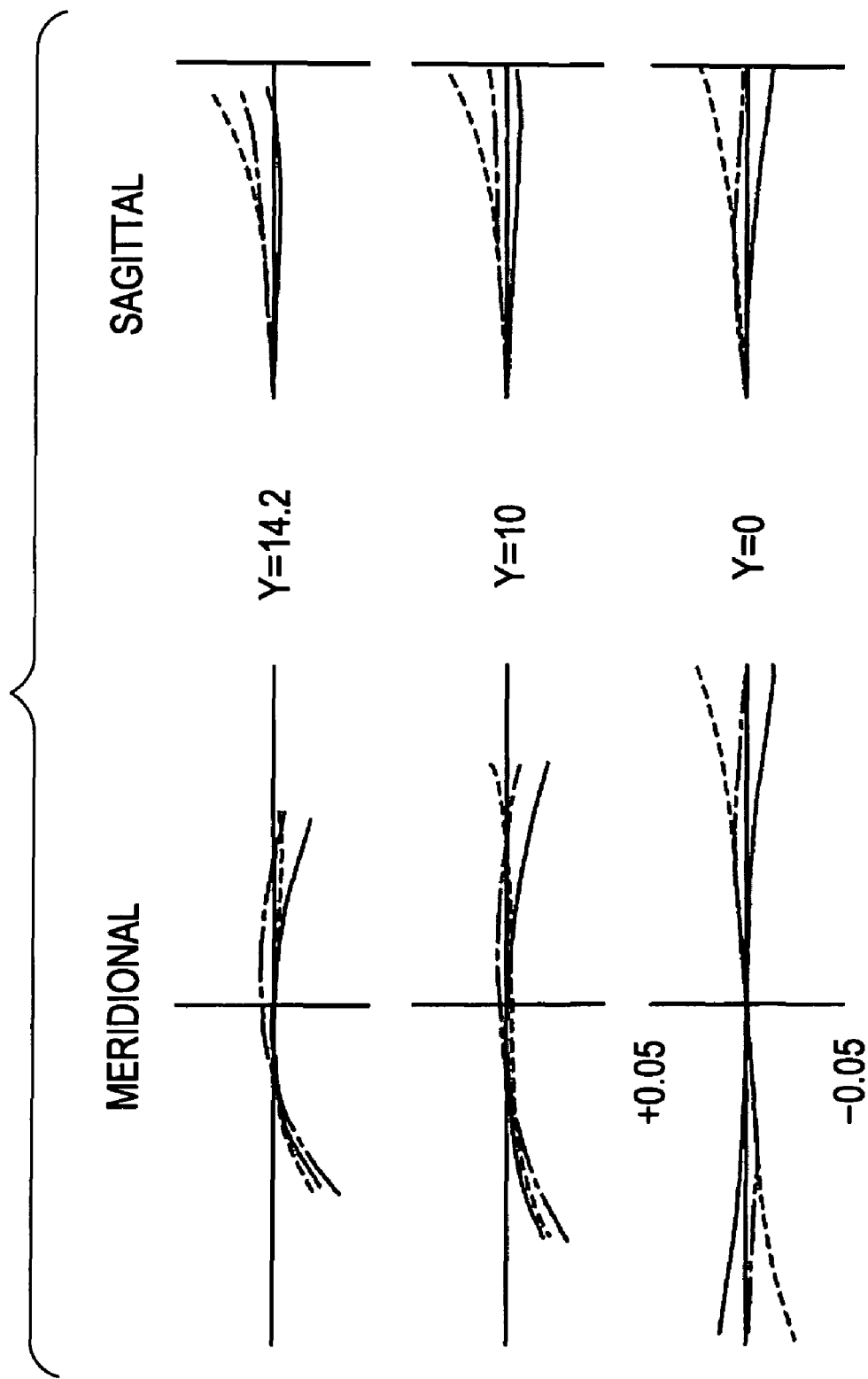
FIG. 12 illustrates aberration diagrams showing lateral aberrations in the coaxial optical system at a limited distance.
Figure 13:
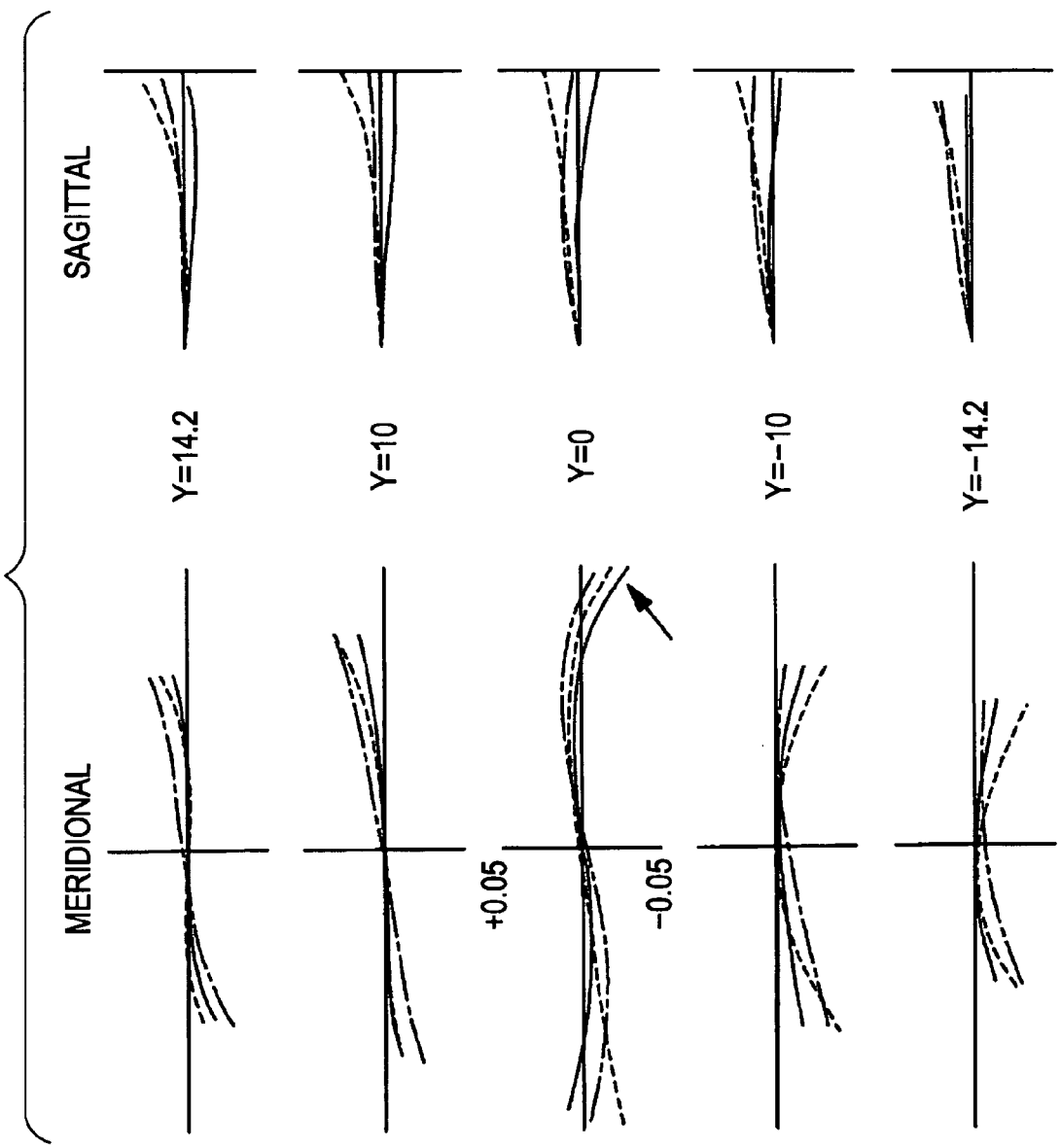
FIG. 13 illustrates aberration diagrams showing lateral aberrations when a tilt lens unit and an object plane are tilted at the same lens position as FIG. 12.

Each of FIGS. 9 to 11 shows a spherical aberration, a field curvature, and a distortion, when θ1=0, in Numerical Example 2, with a lateral magnification of 0 in FIG. 9, −0.1 in FIG. 10, or −0.5 in FIG. 11. Each of FIGS. 12 and 13 shows lateral aberration curves at a meridional surface and a sagittal surface when d10=7.448, with θ1=0 degree in FIG. 12, and θ1=15 degrees and θ3=49 degrees in FIG. 13.

In the spherical aberration curve and the lateral aberration curve of each aberration diagram, solid lines show values based on the d-line, broken lines show values based on the g-line, and dotted-chain lines show values based on the C-line. In astigmatism curves, a solid line represents a sagittal image plane, and a broken line represents a meridional image plane.

In Numerical Example 1 as shown in FIG. 7, good aberration compensation can be provided with θ1=13 degrees. However, a coma toward the lower side is generated in the meridional lateral aberration in FIG. 7 with Y=0 at a part of the aberration curve indicated by an arrow. If the tilt angle θ1 is further increased, the coma is rapidly increased, and the configuration may not be used as a macro lens. Therefore, the object tilt angle may not be increased. The coma is generated because the ray corresponding to the aberration is markedly bent downward at the 16-th surface (the image-side surface of the positive lens unit 250), then is markedly bent upward at the 17-th surface (the object-side surface of the negative lens unit 260), and therefore, as the tilt angle θ1 is increased, the effect with the 16-th surface may remain noticeable. In Numerical Example 2, the positive lens 252 in FIG. 2 is divided into two lenses, that is, the positive lens 252 and the positive lens 261 in FIG. 8. The positive lens 261 is cemented with the negative lens unit 260 in FIG. 2, so that the two surfaces causing the comas are arranged such that the curvature of the most image side surface in the positive lens unit 250 is decreased, and the most object side concave surface in the negative lens unit 260 is changed to a convex surface having a small curvature. Accordingly, an improvement is made such that the amplitudes of the ray corresponding to the coma at the above-mentioned two surfaces are decreased, to reduce the deterioration in aberration until the tilt angle θ1 which is larger than that in Numerical Example 1. In order to change the most object side surface in the negative lens unit 260 to a convex surface with a small curvature, Conditional Expression (6) may be satisfied so that the negative refractive power is distributed to the cemented surface in the negative lens unit 260.

Figure 14:
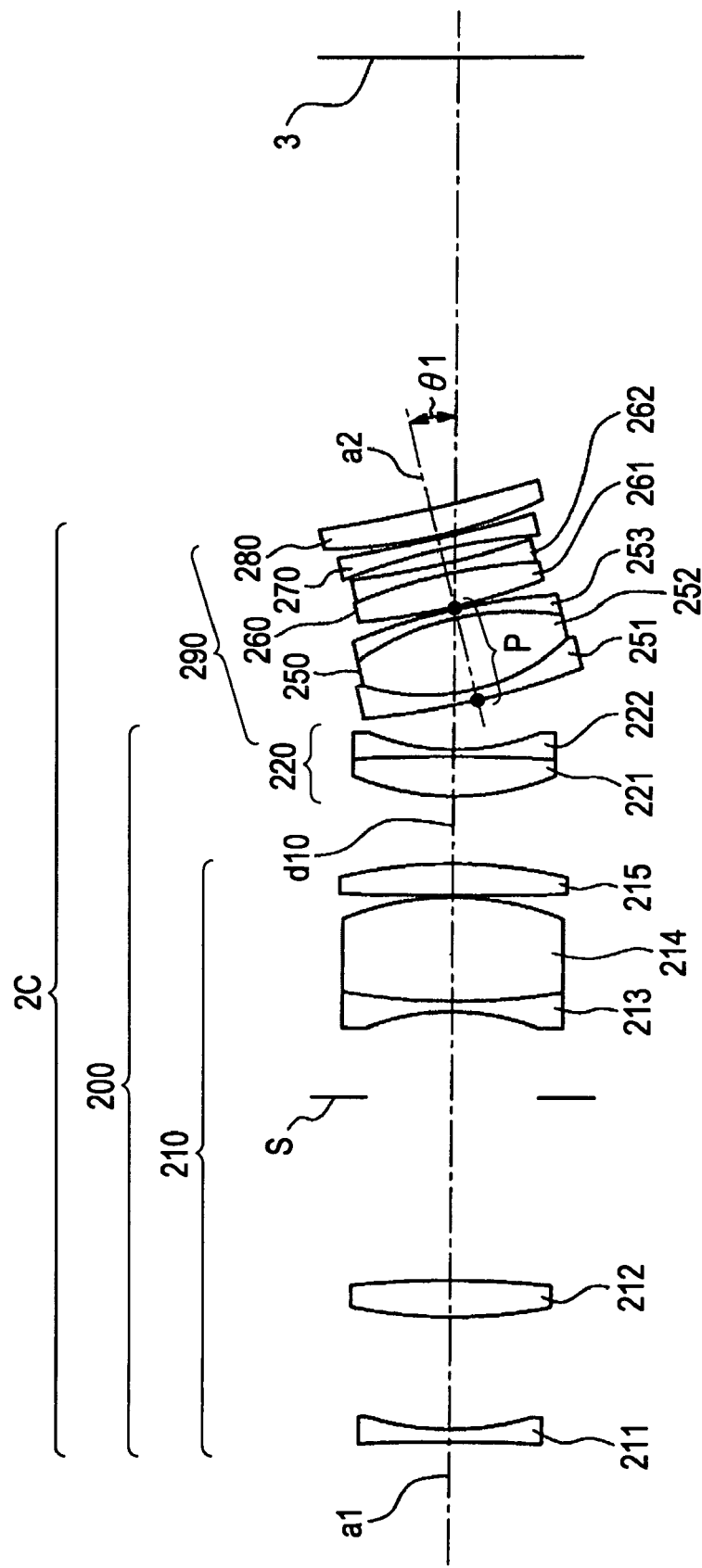
FIG. 14 is a cross section showing a lens arrangement of a tilt lens system according to a third embodiment of the invention.

FIG. 14 is a cross section showing a lens arrangement of a tilt lens system 2C according to a third embodiment of the invention. The tilt lens system 2C includes a master lens system 200, and a tilt lens unit 290, in order from the object side. The master lens system 200 has an optical axis (primary optical axis) a1. The tilt lens unit 290 has a negative refractive power, and has an optical axis a2. The optical axis a2 of the tilt lens unit 290 may be tilted with respect to the optical axis a1 of the master lens system 200. When the optical axis a2 of the tilt lens unit 290 is not tilted, the optical axis a2 is aligned with the optical axis a1 of the master lens system 200, thereby defining a coaxial optical system. The master lens system 200 includes a focus lens unit 210 and a fixed lens unit 220, in order from the object side.

The focus lens unit 210 includes a negative meniscus lens 211 having a concave surface with a larger curvature on the image side, a biconvex lens 212, a diaphragm S, a negative cemented lens composed of a biconcave lens 213 having a concave surface on the object side and a biconvex lens 214, and a biconvex lens 215 having a convex surface with a larger curvature on the image side, in order from the object side. The fixed lens unit 220 includes a negative cemented lens composed of a biconvex lens 221 and a biconcave lens 222, in order from the object side.

The tilt lens unit 290 includes a positive lens unit 250, a negative lens unit 260, a negative lens unit 270, and a positive lens unit 280, in order from the object side. The positive lens unit 250 includes a positive cemented lens composed of three lenses, i.e., a negative meniscus lens 251 having a concave surface with a larger curvature on the image side, a biconvex lens 252, and a negative meniscus lens 253 having a concave surface on the object side. The negative lens unit 260 includes a negative cemented lens composed of a biconvex lens 261 having a convex surface with a larger curvature on the image side, and a biconcave lens 262 having a concave surface with a larger curvature on the object side. The negative lens unit 270 includes a biconcave lens. The positive lens unit 280 includes a positive meniscus lens having a convex surface with a larger curvature on the object side.

Table 7 shows data of each optical element, that is, a curvature radius r, a surface distance d, a refractive index nd, and an Abbe number vd, according to Numerical Example 3 in which specific numerical values are applied to a configuration 1C of the third embodiment, in the case of the coaxial optical system, or in the case where a tilt angle θ1=0, the tilt angle θ1 representing a tilt angle of the optical axis a2 of the tilt lens unit 290 with respect to the primary optical axis a1. The surface number i represents an i-th surface from the object side, the surface distance d represents an axial surface distance between the i-th surface and the (i+1)-th surface, and the refractive index nd and the Abbe number vd are based on the d-line.

TABLE 7

| Optical element | | Surface distance d | Refractive index nd | Abbe number vd |
|---|---|---|---|---|
| 211 | 1 | −427.297 | 1.419 | 1.83481 | 42.7 |
|  | 2 | 29.730 | 12.098 | 1. |  |
| 212 | 3 | 49.823 | 3.829 | 1.83400 | 37.3 |
|  | 4 | −76.827 | 19.998 | 1. |  |
| Diaphragm | 5 | ∞ | 9.000 | 1. |  |
| 213 | 6 | −25.840 | 1.290 | 1.84666 | 23.8 |
| 214 | 7 | 63.853 | 11.000 | 1.48749 | 70.4 |
|  | 8 | −29.534 | 0.200 | 1. |  |
| 215 | 9 | 378.417 | 3.492 | 1.90366 | 31.3 |
|  | 10 | −50.400 | Variable | 1. |  |
| 221 | 11 | 28.217 | 4.053 | 1.90366 | 31.3 |

TABLE 7-continued

| Optical element | | Surface distance d | Refractive index nd | Abbe number vd |
|---|---|---|---|---|
| 222 | 12 | −895.027 | 0.900 | 1.78472 | 25.7 |
|  | 13 | 25.475 | 5.300 | 1. |  |
| 251 | 14 | 84.906 | 1.000 | 1.88300 | 40.8 |
| 252 | 15 | 21.867 | 7.500 | 1.62004 | 36.3 |
| 253 | 16 | −37.274 | 1.000 | 1.72342 | 38.0 |
|  | 17 | −80.621 | 0.200 | 1. |  |
| 261 | 18 | 56.873 | 3.741 | 1.69895 | 30.0 |
| 262 | 19 | −49.738 | 1.200 | 1.88300 | 40.8 |
|  | 20 | 57.058 | 1.688 | 1. |  |
| 270 | 21 | −104.803 | 1.200 | 1.90366 | 31.3 |
|  | 22 | 104.803 | 0.302 | 1. |  |
| 280 | 23 | 46.876 | 3.215 | 1.49700 | 81.6 |
|  | 24 | 288.800 | 47.811 | 1. |  |
| Image pickup surface | 25 | ∞ |  |  |  |

Table 8 shows a focal length, an F-number, an angle of view (2ω), a maximum image height, a lateral magnification, a distance from an object to the first surface, and a variable distance (d10=distance between the focus lens unit 210 and the fixed lens unit 220), in Numerical Example 3.

TABLE 8

| Focal length | 59.83 | | |
|---|---|---|---|
| F-number | 4.08 | | |
| 2ω (deg) | 26.9 | | |
| Maximum image height | 14.2 | | |
| Lateral magnification | 0 | −0.1 | −0.5 |
| Object to 1st surface | ∞ | 603.2 | 125.0 |
| d 10 | 1.700 | 7.512 | 30.764 |

Table 9 shows the optimum object tilt angle θ3 when the tilt angle θ1 is 15 degrees, in Numerical Example 3.

TABLE 9

| Optimum object tilt angle θ3 when θ1 = 15 degrees | | |
|---|---|---|
| | d 10 | |
| | 7.512 | 30.764 |
| θ3 (deg) | 49 | 14 |

Figure 15:
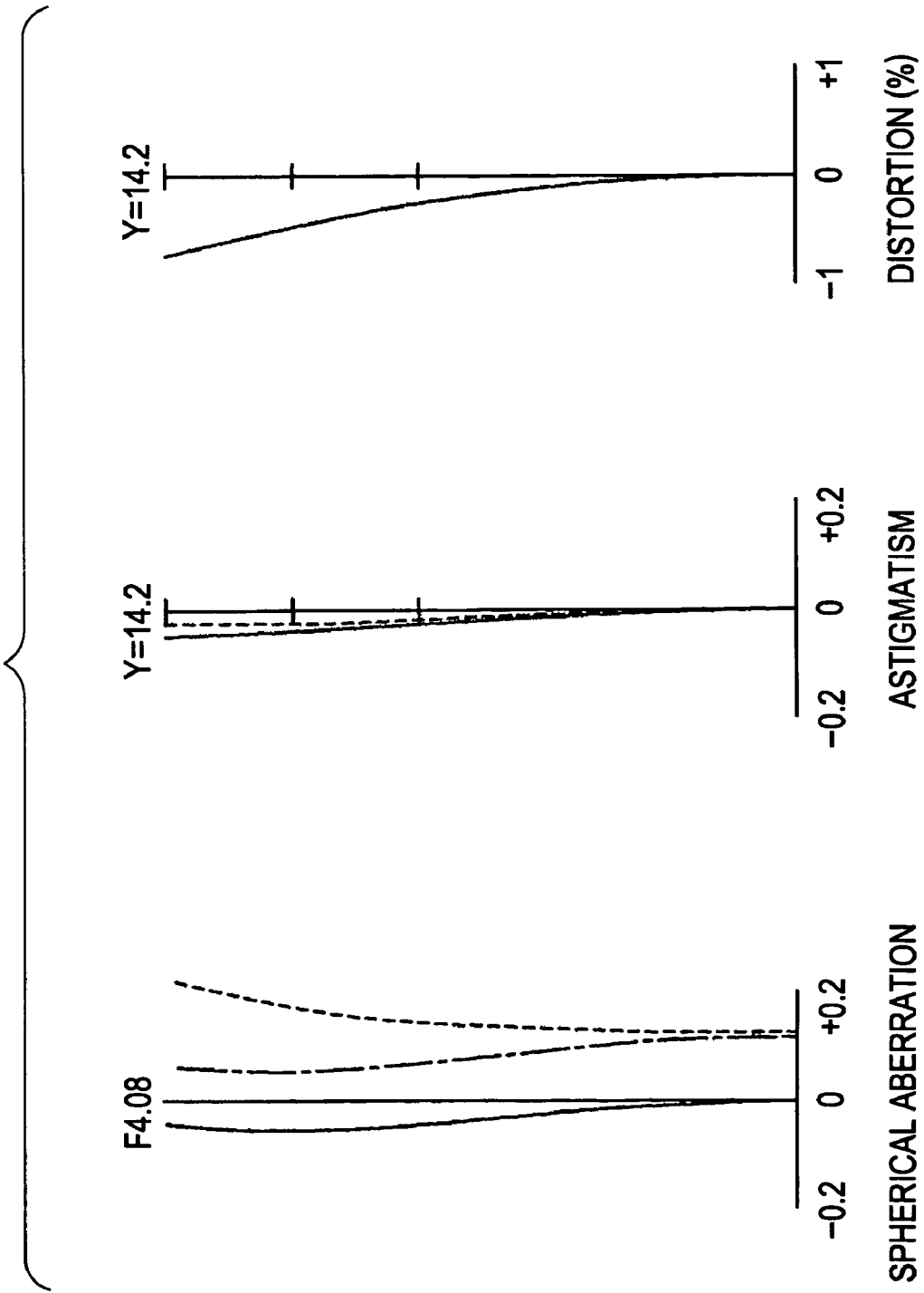
FIG. 15 illustrates aberration diagrams for a spherical aberration, an astigmatism, and a distortion in a coaxial optical system when a lateral magnification is zero, FIGS. 16 to 19 (described later) illustrating aberration diagrams of Numerical Example 3 in which specific numerical values are applied to the third embodiment.
Figure 16:
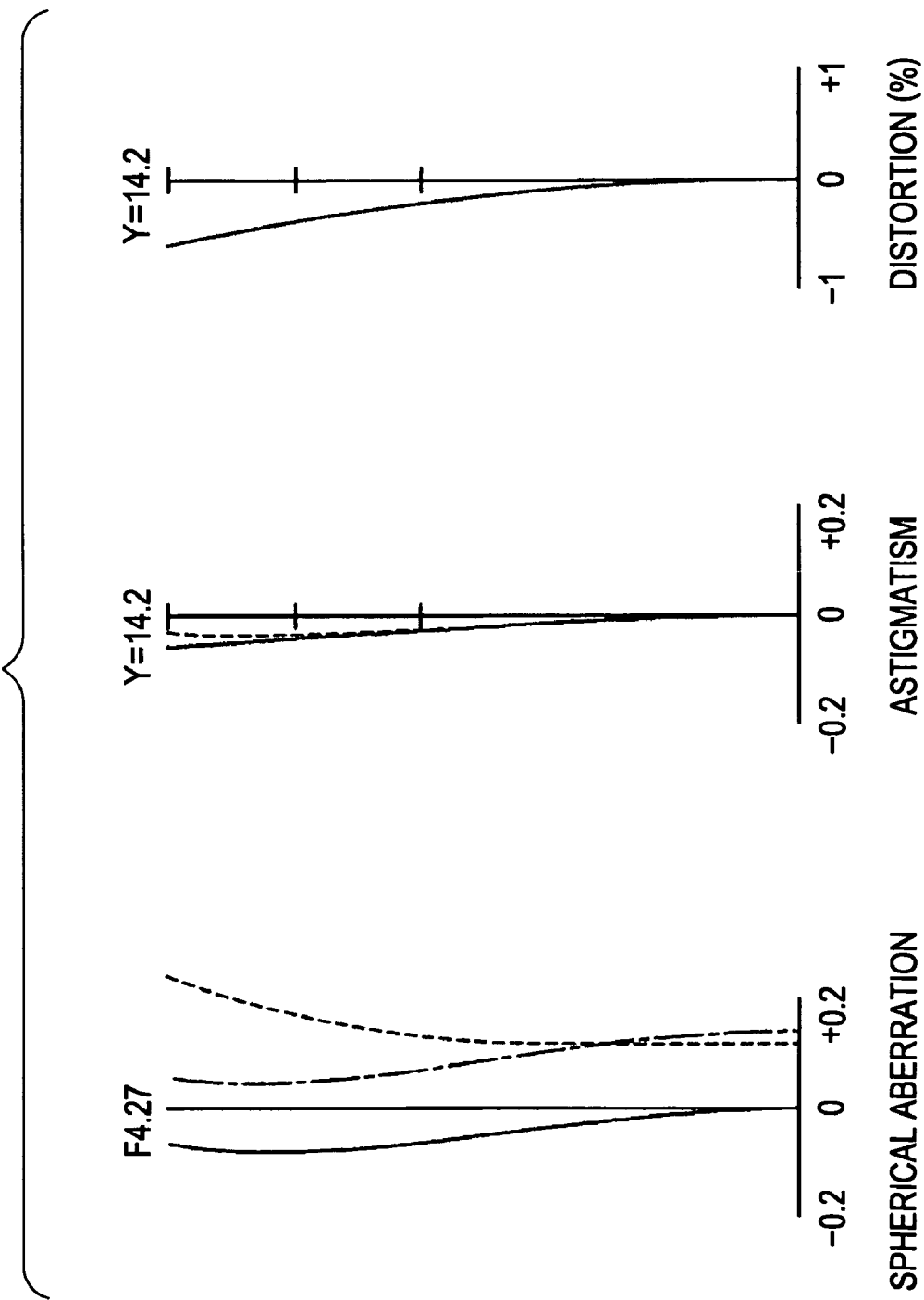
FIG. 16 illustrates aberration diagrams for a spherical aberration, an astigmatism, and a distortion in the coaxial optical system when a lateral magnification is −0.1.
Figure 17:
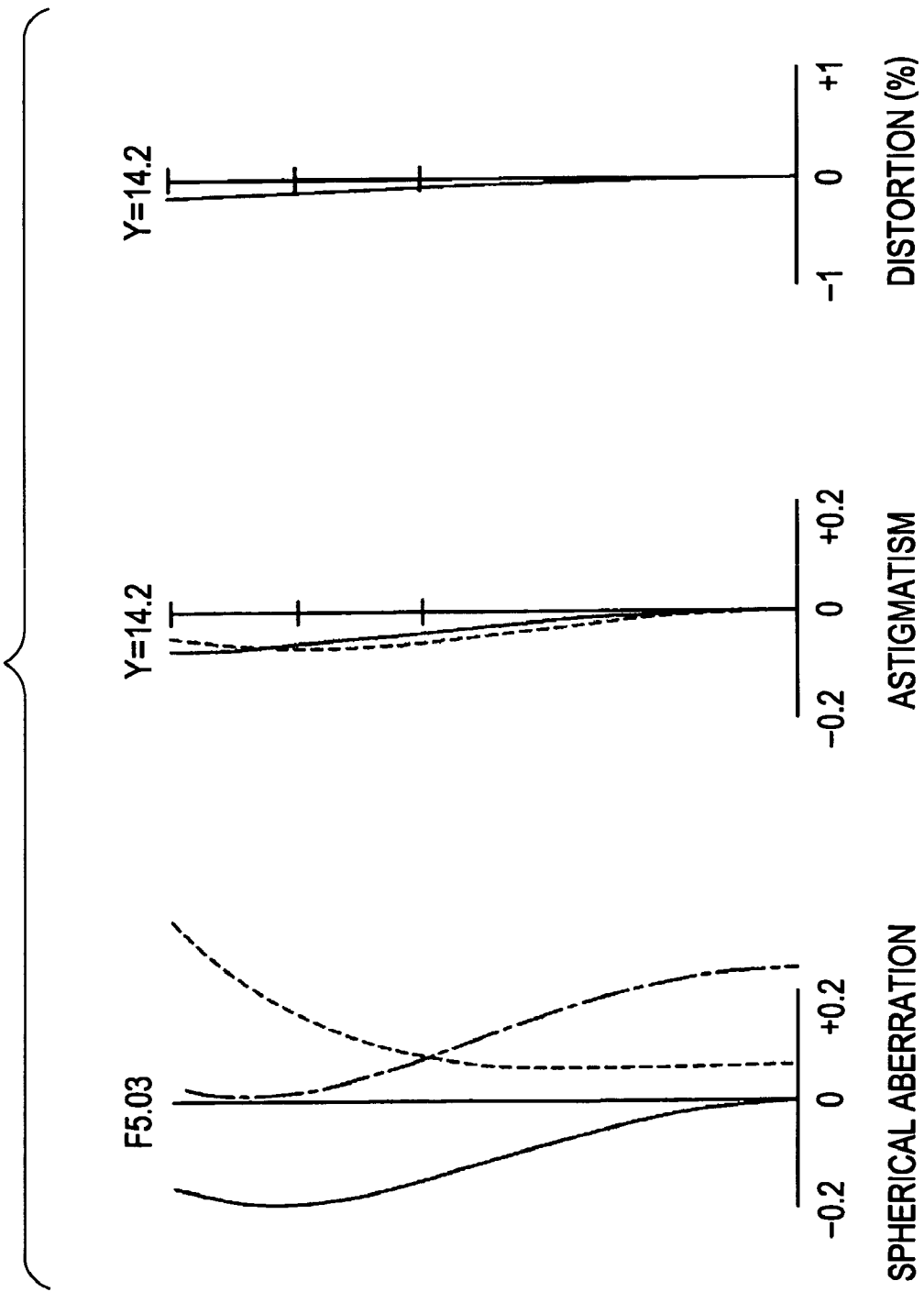
FIG. 17 illustrates aberration diagrams for a spherical aberration, an astigmatism, and a distortion in the coaxial optical system when a lateral magnification is −0.5.
Figure 18:
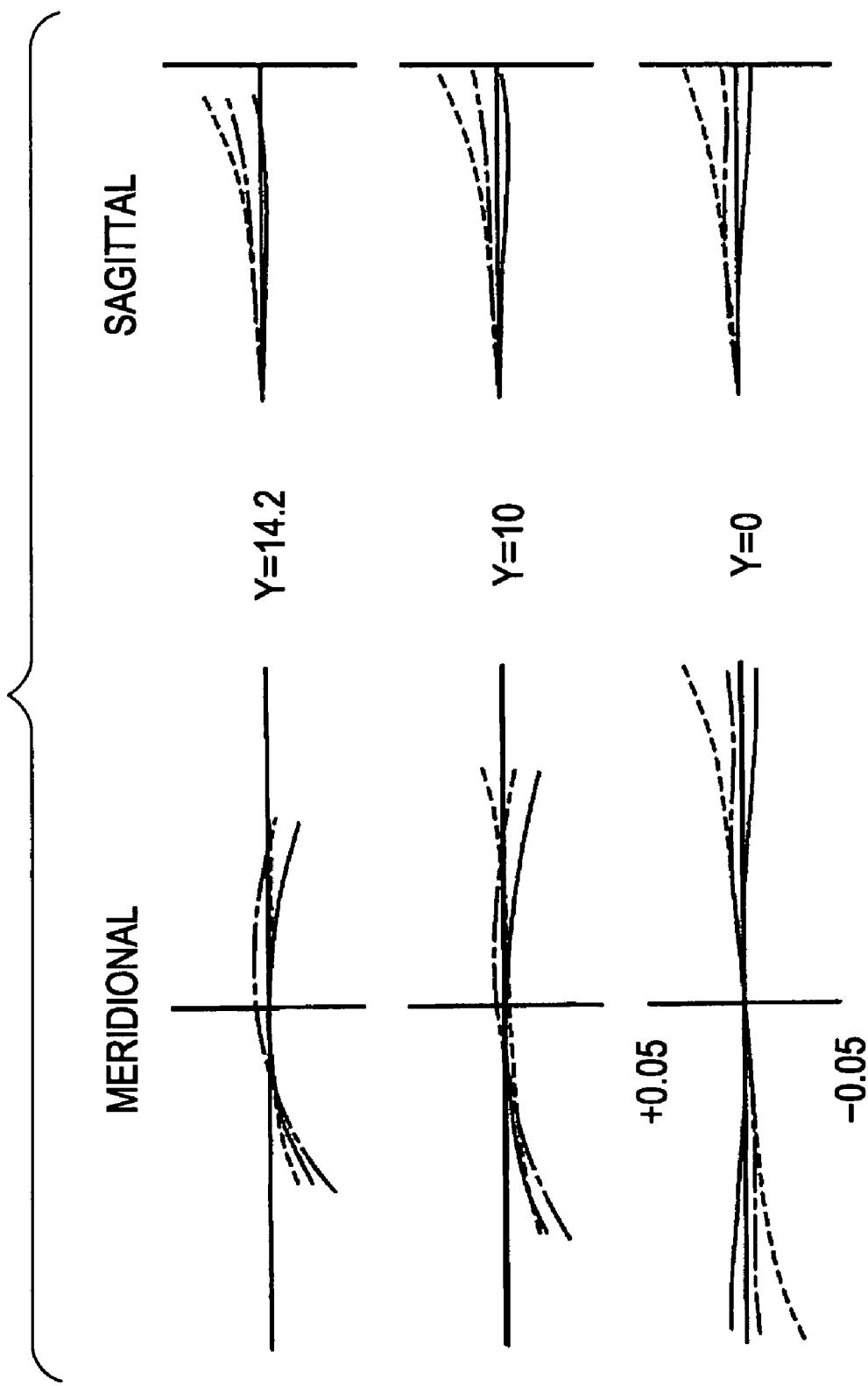
FIG. 18 illustrates aberration diagrams showing lateral aberrations in the coaxial optical system at a limited distance.
Figure 19:
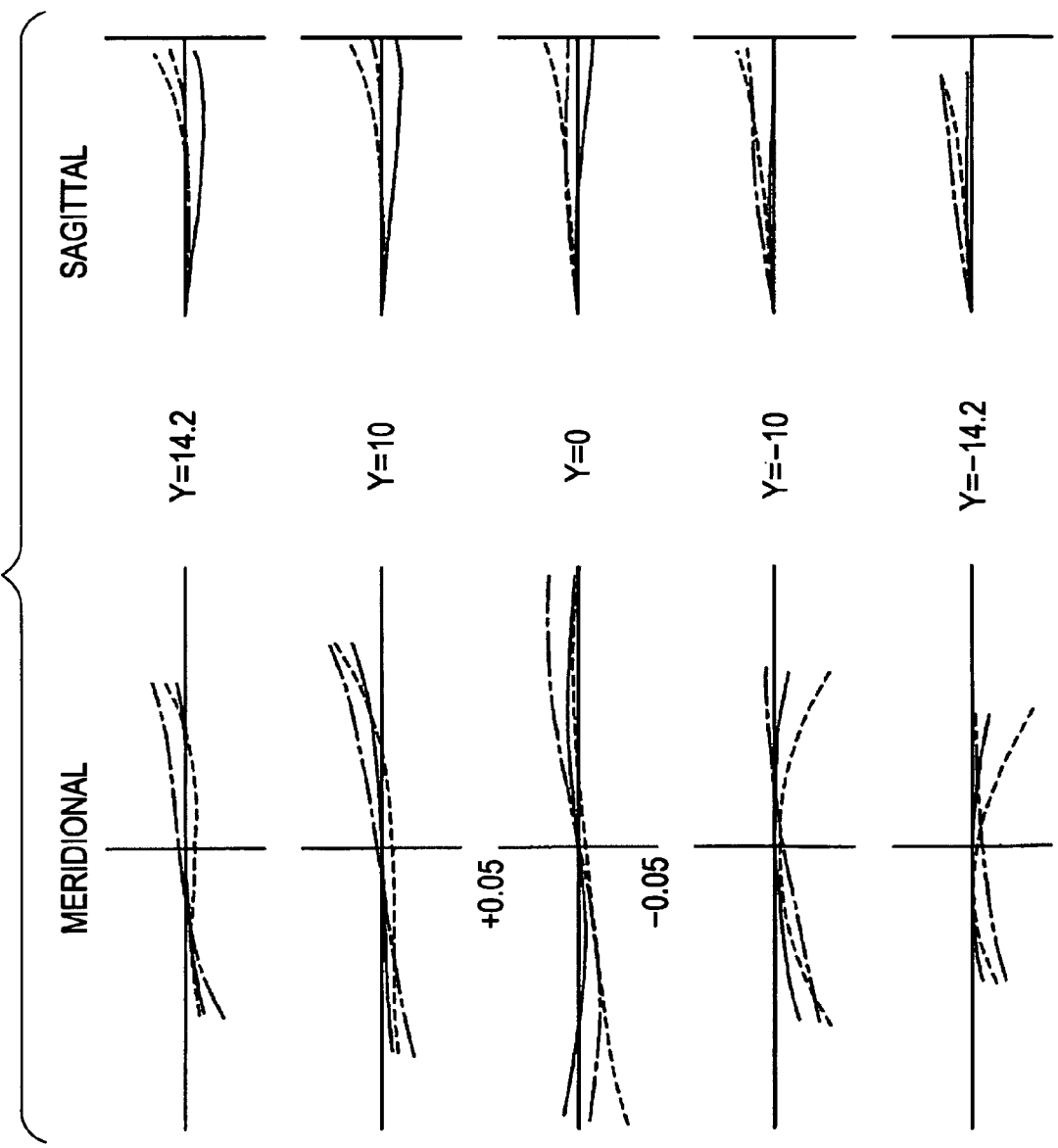
FIG. 19 illustrates aberration diagrams showing lateral aberrations when a tilt lens unit and an object plane are tilted at the same lens position as FIG. 19.

Each of FIGS. 15 to 17 shows a spherical aberration, a field curvature, and a distortion, when θ1=0, in Numerical Example 3, with a lateral magnification of 0 in FIG. 15, −0.1 in FIG. 16, or −0.5 in FIG. 17. Each of FIGS. 18 and 19 shows lateral aberration curves at a meridional surface and a sagittal surface when d10=7.512, with θ1=0 degree in FIG. 18, and θ1=15 degrees and θ3=49 degrees in FIG. 19.

In the spherical aberration curve and the lateral aberration curve of each aberration diagram, solid lines show values based on the d-line, broken lines show values based on the g-line, and dotted-chain lines show values based on the C-line. In astigmatism curves, a solid line represents a sagittal image plane, and a broken line represents a meridional image plane.

Figure 20:
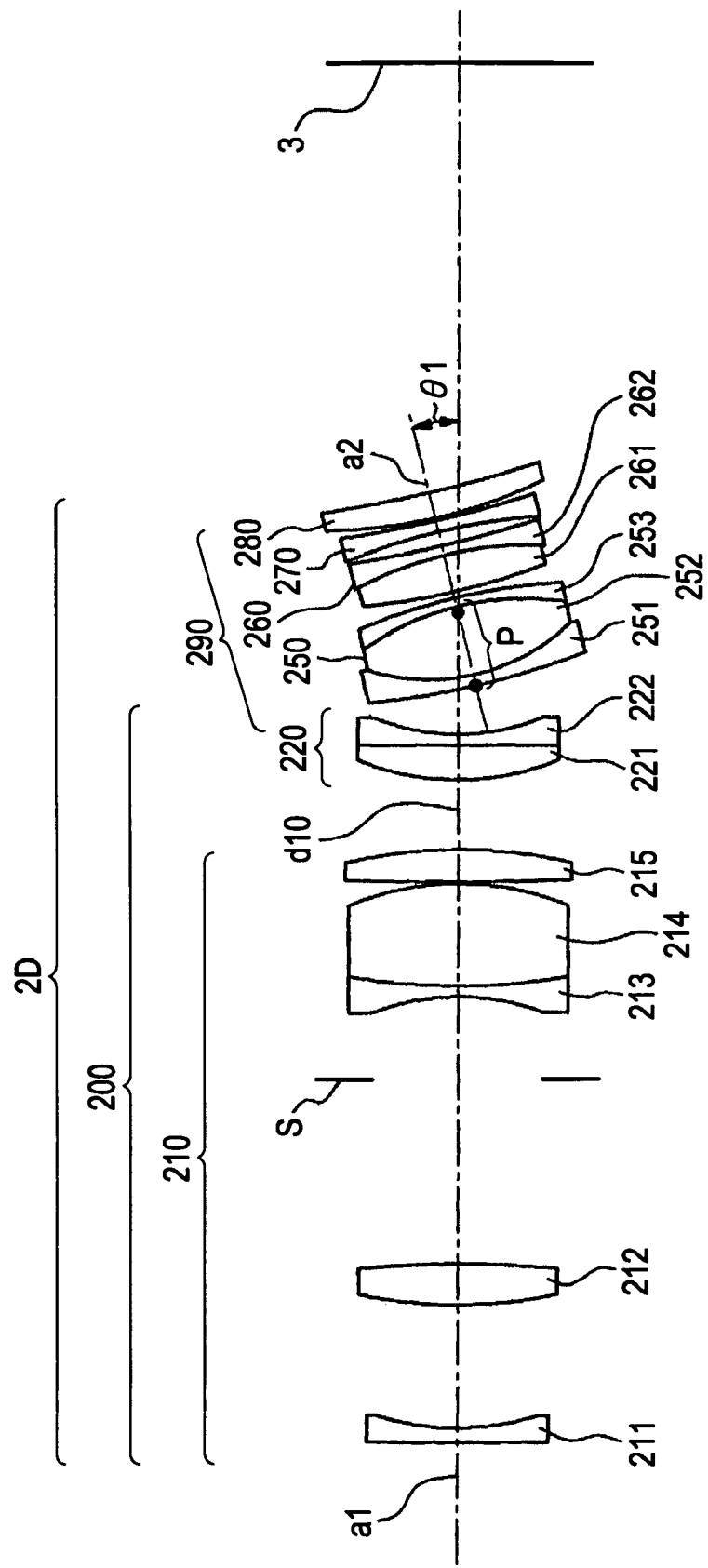
FIG. 20 is a cross section showing a lens arrangement of a tilt lens system according to a fourth embodiment of the invention.

FIG. 20 is a cross section showing a lens arrangement of a tilt lens system 2D according to a fourth embodiment of the invention. The tilt lens system 2D includes a master lens system 200, and a tilt lens unit 290, in order from the object side. The master lens system 200 has an optical axis (primary optical axis) a1. The tilt lens unit 290 has a negative refractive power, and has an optical axis a2. The optical axis a2 of the tilt lens unit 290 may be tilted with respect to the optical axis a1 of the master lens system 200. When the optical axis a2 of the tilt lens unit 290 is not tilted, the optical axis a2 is aligned with the optical axis a1 of the master lens system 200, thereby defining a coaxial optical system. The master lens system 200 includes a focus lens unit 210 and a fixed lens unit 220, in order from the object side.

The focus lens unit 210 includes a negative meniscus lens 211 having a concave surface with a larger curvature on the image side, a biconvex lens 212, a diaphragm S, a negative cemented lens composed of a biconcave lens 213 having a concave surface on the object side and a biconvex lens 214, and a biconvex lens 215 having a convex surface with a larger curvature on the image side, in order from the object side. The fixed lens unit 220 includes a negative cemented lens composed of a biconvex lens 221 and a biconcave lens 222, in order from the object side.

The tilt lens unit 290 includes a positive lens unit 250, a negative lens unit 260, a negative lens unit 270, and a positive lens unit 280, in order from the object side. The positive lens unit 250 includes a positive cemented lens composed of three lenses, i.e., a negative meniscus lens 251 having a concave surface with a larger curvature on the image side, a biconvex lens 252, and a negative meniscus lens 253 having a concave surface on the object side. The negative lens unit 260 includes a negative cemented lens composed of a biconvex lens 261 having a convex surface with a larger curvature on the image side, and a biconcave lens 262 having a concave surface with a larger curvature on the object side. The negative lens unit 270 includes a biconcave lens. The positive lens unit 280 includes a positive meniscus lens having a convex surface with a larger curvature on the object side.

Table 10 shows data of each optical element, that is, a curvature radius r, a surface distance d, a refractive index nd, and an Abbe number vd, according to Numerical Example 4 in which specific numerical values are applied to a configuration 1D of the fourth embodiment, in the case of the coaxial optical system, or in the case where a tilt angle θ1=0, the tilt angle θ1 representing a tilt angle of the optical axis a2 of the tilt lens unit 290 with respect to the primary optical axis a1. The surface number i represents an i-th surface from the object side, the surface distance d represents an axial surface distance between the i-th surface and the (i+1)-th surface, and the refractive index nd and the Abbe number vd are based on the d-line.

TABLE 10

| Optical element | Surface number i | Curvature radius r | Surface distance d | Refractive index nd | Abbe number vd |
|---|---|---|---|---|---|
| 211 | 1 | −847.636 | 1.419 | 1.83481 | 42.7 |
|  | 2 | 29.739 | 13.517 | 1. |  |
| 212 | 3 | 50.820 | 4.406 | 1.83400 | 37.3 |
|  | 4 | −81.930 | 19.998 | 1. |  |
| Diaphragm | 5 | ∞ | 9.000 | 1. |  |
| 213 | 6 | −26.718 | 1.290 | 1.84666 | 23.8 |
| 214 | 7 | 62.215 | 10.997 | 1.48749 | 70.4 |
|  | 8 | −30.279 | 0.200 | 1. |  |
| 215 | 9 | 367.168 | 3.435 | 1.90366 | 31.3 |
|  | 10 | −51.631 | Variable |  |  |
| 221 | 11 | 27.576 | 4.131 | 1.90366 | 31.3 |
| 222 | 12 | −642.983 | 0.900 | 1.78472 | 25.7 |
|  | 13 | 25.000 | 5.300 | 1. |  |
| 251 | 14 | 62.983 | 1.000 | 1.88300 | 40.8 |
| 252 | 15 | 20.278 | 7.800 | 1.62004 | 36.3 |

TABLE 10-continued

| Optical element | Surface number i | Curvature radius r | Surface distance d | Refractive index nd | Abbe number vd |
|---|---|---|---|---|---|
| 253 | 16 | −40.594 | 1.000 | 1.58144 | 40.9 |
|  | 17 | −115.819 | 0.702 | 1. |  |
| 261 | 18 | 159.651 | 3.957 | 1.69895 | 30.0 |
| 262 | 19 | −31.012 | 1.000 | 1.88300 | 40.8 |
|  | 20 | 84.371 | 1.459 | 1. |  |
| 270 | 21 | −110.588 | 1.000 | 1.90366 | 31.3 |
|  | 22 | 110.588 | 0.279 | 1. |  |
| 280 | 23 | 48.173 | 3.237 | 1.49700 | 81.6 |
|  | 24 | 1471.120 | 46.279 | 1. |  |
| Image pickup surface | 25 | ∞ |  |  |  |

Table 11 shows a focal length, an F-number, an angle of view (2ω), a maximum image height, a lateral magnification, a distance from an object to the first surface, and a variable distance (d10=distance between the focus lens unit 210 and the fixed lens unit 220), in Numerical Example 4.

TABLE 11

| Focal length | 59.55 | | |
|---|---|---|---|
| F-number | 4.08 | | |
| 2ω (deg) | 27.0 | | |
| Maximum image height | 14.2 | | |
| Lateral magnification | 0 | −0.1 | −0.5 |
| Object to 1st surface | ∞ | 599.9 | 123.9 |
| d 10 | 1.704 | 7.510 | 30.740 |

Table 12 shows the optimum object tilt angle θ3 when the tilt angle θ1 is 15 degrees, in Numerical Example 4.

TABLE 12

| Optimum object tilt angle θ3 when θ1 = 15 degrees | | |
|---|---|---|
|  | d 10 | |
|  | 7.510 | 30.740 |
| θ3 (deg) | 48 | 14 |

Figure 21:
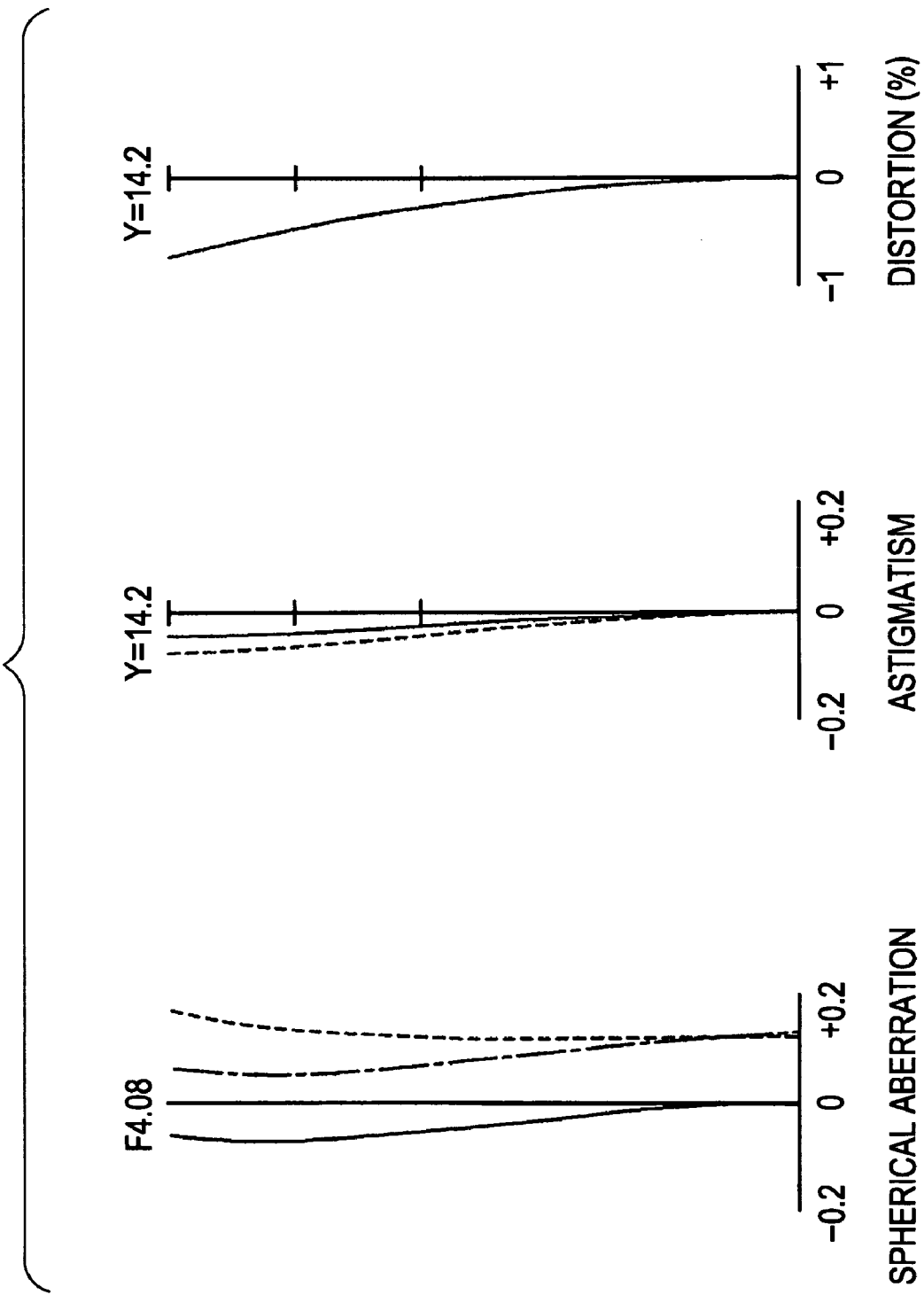
FIG. 21 illustrates aberration diagrams for a spherical aberration, an astigmatism, and a distortion in a coaxial optical system when a lateral magnification is zero, FIGS. 22 to 25 (described later) illustrating aberration diagrams of Numerical Example 4 in which specific numerical values are applied to the fourth embodiment.
Figure 22:
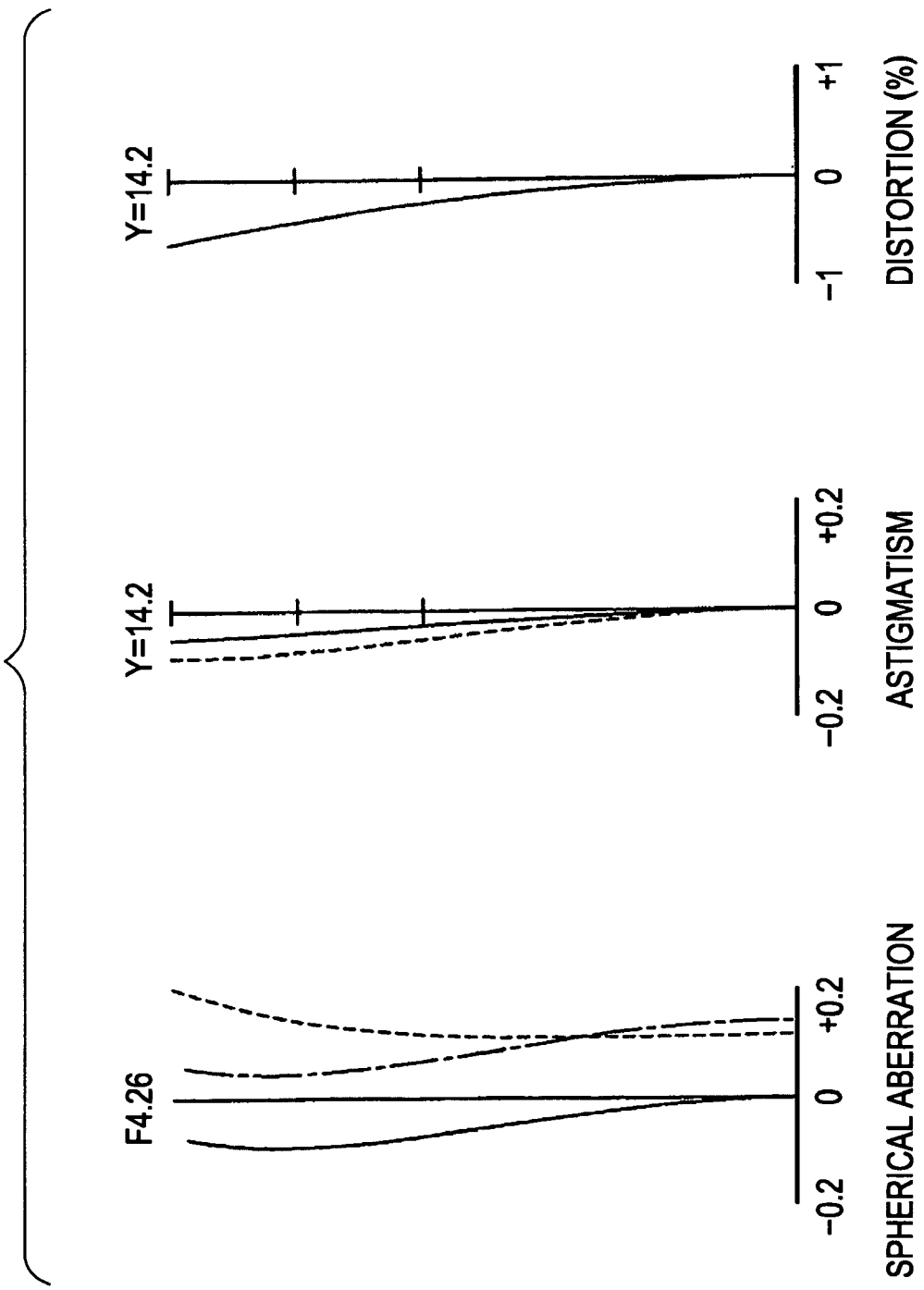
FIG. 22 illustrates aberration diagrams for a spherical aberration, an astigmatism, and a distortion in the coaxial optical system when a lateral magnification is −0.1.
Figure 23:
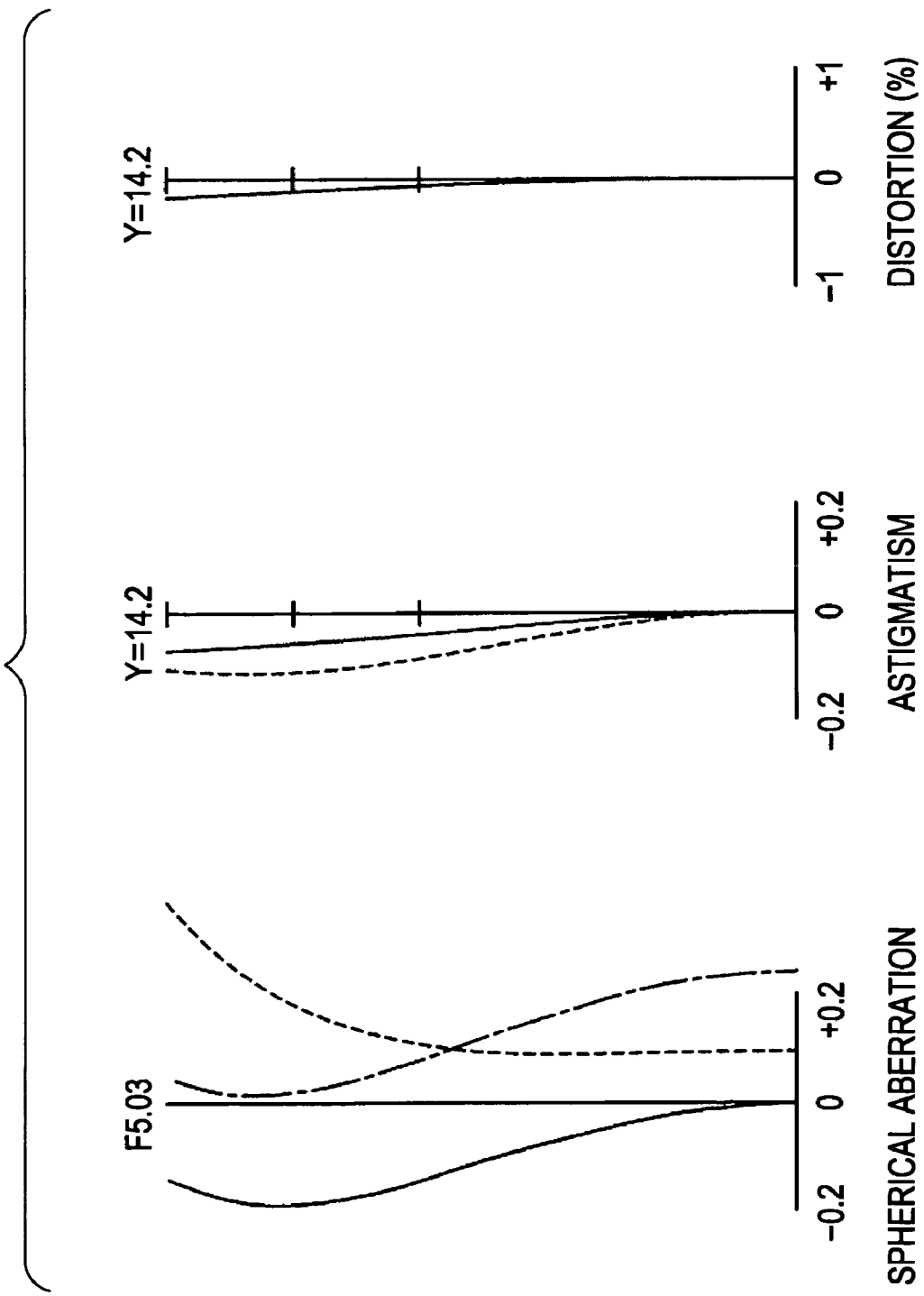
FIG. 23 illustrates aberration diagrams for a spherical aberration, an astigmatism, and a distortion in the coaxial optical system when a lateral magnification is −0.5.
Figure 24:
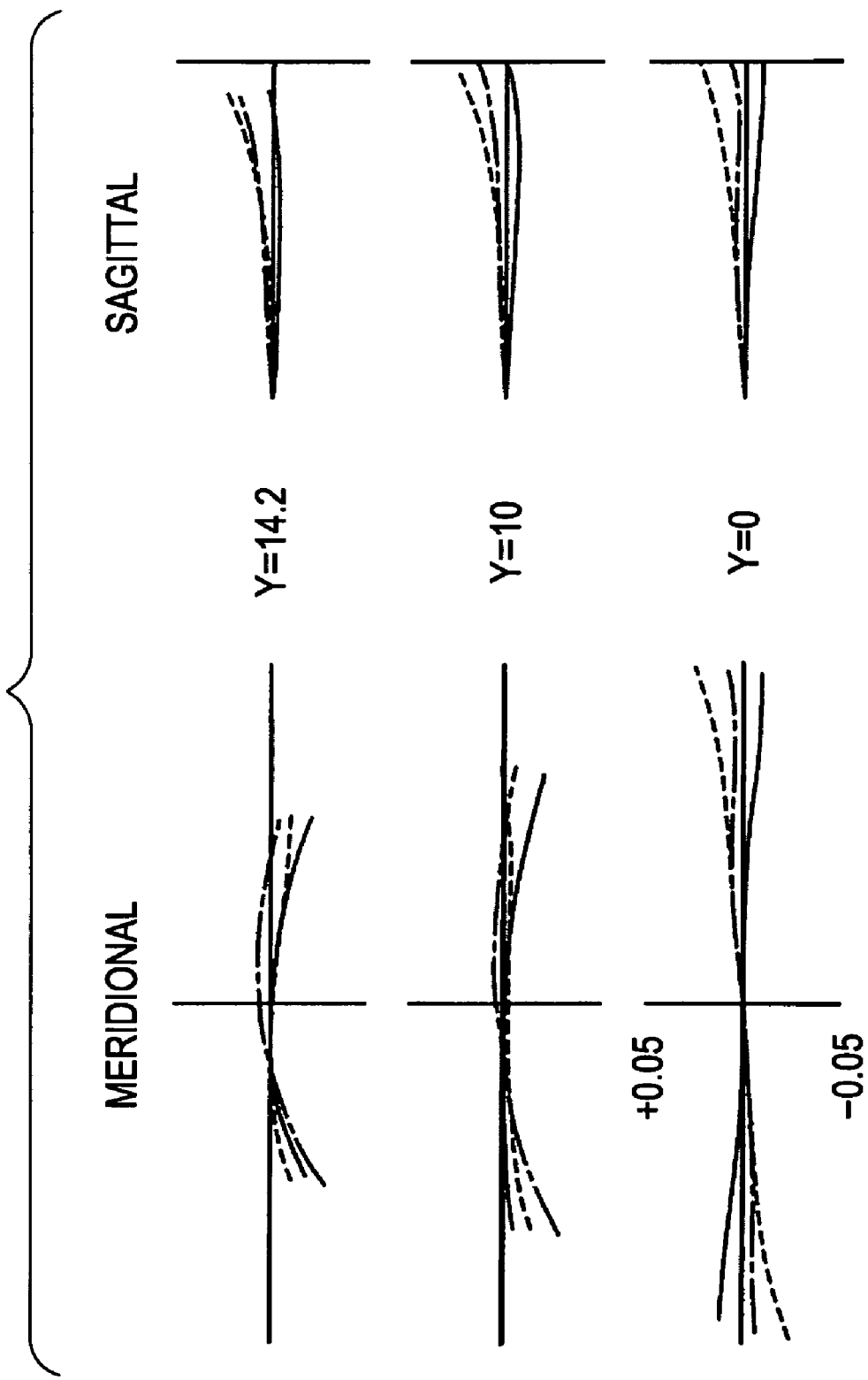
FIG. 24 illustrates aberration diagrams showing lateral aberrations in the coaxial optical system at a limited distance.

Each of FIGS. 21 to 23 shows a spherical aberration, a field curvature, and a distortion, when θ1=0, in Numerical Example 4, with a lateral magnification of 0 in FIG. 21, −0.1 in FIG. 22, or −0.5 in FIG. 23. Each of FIGS. 24 and 25 shows lateral aberration curves at a meridional surface and a sagittal surface when d10=7.510, with θ1=0 degree in FIG. 24, and θ1=15 degrees and θ3=48 degrees in FIG. 25.

In the spherical aberration curve and the lateral aberration curve of each aberration diagram, solid lines show values based on the d-line, broken lines show values based on the g-line, and dotted-chain lines show values based on the C-line. In astigmatism curves, a solid line represents a sagittal image plane, and a broken line represents a meridional image plane.

Next, features of Numerical Examples 3 and 4 are described. The effect of the improvement from Numerical Example 1 to Numerical Example 2 is obvious through comparison between FIGS. 7 and 13 as described above. However, referring to FIGS. 12 and 13, a coma is generated at a part indicated by an arrow in FIG. 13 with Y=0 due to tilting. Thus, an image quality like that without tilting may not be obtained. For the usage of the tilt macro lens system, precise representation is frequently demanded for photographing a small product or a close-up of a flowering plant. Accordingly, additional aberration compensation may be necessary during tilting.

Numerical Examples 3 and 4 are similar configurations, to compensate the coma by a method opposite to the above-described method. In either case, the positive lens unit 250 of the tilt lens unit 290 includes a cemented lens of three lenses. Describing Numerical Example 3, Conditional Expression (7) is satisfied, so that the second cemented surface of the positive lens unit 250 has a negative refractive power. Thus, the effect of the improvement can be obtained, in which the coma toward the upper side generated at the exit surface of the positive lens unit 250 cancels the coma toward the upper side generated at the cemented surface located in front of the exit surface. Describing Numerical Example 4, Conditional Expression (8) is satisfied, so that the second cemented lens in the positive lens unit 250 has a positive refractive power in a manner opposite to Numerical Example 3. The positive refractive power is distributed to the above-mentioned cemented surface and the subsequently arranged exit surface, so as to reduce the aberration.

Table 13 shows values of Numerical Examples 1 to 4 corresponding to Conditional Expressions (1) to (10).

TABLE 13

| Conditional expression | Numerical example | 1 | 2 | 3 | 4 |
|---|---|---|---|---|---|
| (1) | βt | 1.41 | 1.48 | 1.44 | 1.47 |
| (2) | P | 4.76 | 9.60 | 9.36 | 8.21 |
|  | H 1 | 7.19 | 13.98 | 15.33 | 15.48 |
|  | H 2 | 11.43 | 20.78 | 22.37 | 22.29 |
|  | f t 1 | 108.57 | 229.72 | 213.97 | 142.13 |
|  | f t 2 | −77.50 | −168.57 | −159.19 | −84.29 |
| (3) | \| f t 1 / f t 2 \| | 1.40 | 1.36 | 1.34 | 1.69 |
|  | f t 3 | −42.20 | −62.49 | −57.83 | −61.06 |
|  | f t 4 | 56.98 | 137.07 | 112.10 | 100.13 |
| (4) | \| f t 3 / f t 4 \| | 0.74 | 0.45 | 0.52 | 0.61 |
| (5) | n t 1 1 − n t 1 2 | 0.25337 | 0.26296 | 0.26296 | 0.26296 |
| (6) | n t 2 1 − n t 2 2 |  | −0.16564 | −0.18405 | −0.18405 |
| (7)(8) | n t 1 2 − n t 1 3 |  |  | −0.10338 | 0.03860 |
| (9) | β f | 1.11 | 0.69 | 0.71 | 0.69 |
| (10) | h 2 / h 1 | 1.49 | 1.40 | 1.38 | 1.41 |

Herein, H2 is distance from surface nearest to object side in tilt lens unit to second principal point.

In a tilt perspective control lens of a related art, AF is not operable, and AE may not be operable. A perspective control is a troublesome work, and therefore, is not convenient.

With the tilt lens system according to the embodiment of the invention, a principle is described for proper operations of AF and AE in a normal use condition and during tilting. The tilt lens system can be used as a normal lens without any disadvantage, and easily control the depth of field, this function being not provided by the normal lens. Also, the normal lens system may have an inexpensive, perspective control function, merely by adding about five lenses and a simple perspective control mechanism to the normal lens system. Therefore, an inexpensive, easy-to-use perspective control lens can be provided.

The above configurations and numerical examples are merely examples to attain the invention. When such an example configuration is applied to a single-lens reflex image pickup apparatus, the master lens system 200 desirably has a relatively large back focal length, and a small F-number (which means bright). Thus, such a configuration can be designed on the basis of many types of photographic lens systems of related arts. Alternatively, a plurality of lens units may be movable, and the master lens system 200 may serve as a zoom lens. Still alternatively, the tilt lens unit 290 may be designed to reduce deterioration in aberration during tilting by taking a single-lens reflex rear conversion lens into consideration. Accordingly, a variety of tilt lens units may be provided. Yet alternatively, lens units except the tilt lens unit may be movable in a direction perpendicular to the optical axis, to stabilize an image.

Next, an image pickup apparatus according to an embodiment of the invention is described.

The image pickup apparatus according to the embodiment of the invention includes a tilt lens system and an image pickup device that converts an optical image formed with the tilt lens system into an electric signal. In the tilt lens system, a tilt lens unit having a negative refractive power and having an optical axis capable of being tilted with respect to a primary optical axis, which is shared by a focus lens unit at the center of a diaphragm, the focus lens unit being movable during focusing and the center of a diaphragm, is arranged on the image side of the focus lens unit and the diaphragm. Also, Conditional Expressions (1) and (2) are satisfied as follows:

$$1.3 < \beta t < 1.7 \tag{1}$$

$$0 < P < H1 \tag{2}$$

where βt is a lateral magnification of the tilt lens unit when the optical axis is not tilted, P is a distance from a most object side surface of the tilt lens unit to a rotating center of the tilt lens unit when the optical axis of the tilt lens unit is tilted, and H1 is a distance from the most object side surface of the tilt lens unit to a first principal point of the tilt lens unit.

In this embodiment of the invention, by tilting the partial lens unit, photographing satisfying the Scheimpflug rule can be provided. Also, AF and AE can be used not only in a normal use condition, but also during tilting; thereby an operation of photographing with tilting can be easily performed.

Next, an example implementing the image pickup apparatus of the embodiment is described. In this embodiment, the image pickup apparatus of the invention is applied to a digital still camera. FIG. 26 is a block diagram showing an example configuration of the digital still camera.

A digital still camera 100 includes a lens block 10 for a capturing function, a camera signal processor 20 for signal processing such as analog-digital conversion of the captured image signal, an image processor 30 for recording and reproducing processing of the image signal, a liquid crystal display (LCD) 40 for displaying the captured image and the like, a reader/writer (R/W) 50 for reading/writing data from and on a memory card 51, a central processing unit (CPU) 60 for control of the entire apparatus, an input unit 70 for input operation by a user, and a lens driving controller 80 for control of lens driving in the lens block 10.

The lens block 10 includes an optical system having the tilt lens system 2 to which the present invention is applied, an image pickup device 12 such as a charge coupled device (CCD), a complementary metal-oxide semiconductor (CMOS), or the like. The camera signal processor 20 converts an output signal from the image pickup device 12 into a digital signal, and performs signal processing, such as denoising, compensating image quality, and converting the signal into a luminance signal and a color-difference signal. The image processor 30 performs compressing and encoding, or decompressing and decoding of the image signal on the basis of a given image data format, and conversion processing of data specification such as a resolution. The tilt lens system 2 may be any of the above-described tilt lens systems 2A to 2D according to the corresponding one of Numerical Examples 1 to 4. Alternatively, a tilt lens system according to an embodiment other than the above-mentioned embodiments and numerical examples may be used.

The memory card 51 is a removable semiconductor memory. The reader/writer 50 writes the image data encoded with the image processor 30 on the memory card 51, or reads the image data stored in the memory card 51. The CPU 60 is a control processor that controls each circuit block in the digital still camera. The CPU 60 controls each circuit in response to an instruction input signal or the like from the input unit 70.

The input unit 70 includes, for example, a shutter release button for a shutter operation, and a mode selection switch for selection of an operation mode. The input unit 70 outputs the instruction input signal corresponding to the operation by the user to the CPU 60. The lens driving controller 80 controls a motor (not shown) and the like for driving the lenses in the tilt lens system 2, on the basis of the control signal from the CPU 60.

Next, an operation of the digital still camera 100 is described.

In a standby mode of photographing, under the control of the CPU 60, the image signal captured with the lens block 10 is output to the LCD 40 through the camera signal processor 20, and is displayed as a camera-through image. When an instruction input signal for tilting is input from the input unit 70, the CPU 60 outputs a control signal to the lens driving controller 80. Under the control of the lens driving controller 80, the tilt lens unit (290 in FIG. 2 or the like) in the tilt lens system 2 is tilted.

When a shutter (not shown) in the lens block 10 is operated in response to the instruction input signal from the input unit 70, the captured image signal is output from the camera signal processor 20 to the image processor 30 so as to be compressed and encoded, and the processed signal is converted into digital data according to a given data format. The converted data is output to the reader/writer 50, and is written on the memory card 51.

For example, focusing may be performed such that the lens driving controller 80 moves the focus lens unit in the tilt lens system 2 in response to the control signal from the CPU 60 when the shutter release button is half pressed, or fully pressed for recording.

To reproduce image data stored in the memory card 51, the reader/writer 50 reads desired image data from the memory card 51 in response to an operation through the input unit 70, the image processor 30 performs decompressing and decoding processing for the read image data, and then the reproduced image signal is output to the LCD 40. Thus, a reproduction image is displayed.

In the above embodiment, while the image pickup apparatus of the invention is applied to the digital still camera, for example, the image pickup apparatus may be applied to other types of image pickup apparatuses such as a video camera.

Also, the shapes and numerical values of the parts illustrated in the embodiments and the numerical examples are merely examples for implementing the embodiment. The technical scope of the invention should not be limited by these examples.

It should be understood by those skilled in the art that various modifications, combinations, sub-combinations and alterations may occur depending on design requirements and other factors insofar as they are within the scope of the appended claims or the equivalents thereof.

What is claimed is:

1. A tilt lens system comprising:
a focus lens unit being movable during focusing
a diaphragm sharing a primary optical axis with the focus lens unit at the center of the diaphragm and being arranged with or within the focus lens unit; and
a tilt lens unit having a negative refractive power and having an optical axis capable of being tilted with respect to the primary optical axis,
wherein the tilt lens unit is arranged on an image side of the focus lens unit and the diaphragm, and
wherein Conditional Expressions (1) and (2) are satisfied as follows, $$1.3 < \beta t < 1.7 \tag{1}$$

$$0 < P < H1 \tag{2}$$

where $\beta t$ is a lateral magnification of the tilt lens unit when the optical axis is not tilted, P is a distance from a most object side surface of the tilt lens unit to a rotating center of the tilt lens unit when the optical axis of the tilt lens unit is tilted, and H1 is a distance from the most object side surface of the tilt lens unit to a first principal point of the tilt lens unit.

2. The tilt lens system according to claim 1,
wherein the tilt lens unit includes a positive lens unit, a negative lens unit, a negative lens unit, and a positive lens unit, in order from the object side, and
wherein Conditional Expressions (3) and (4) are satisfied as follows, $$1.25 < |ft1/ft2| < 1.9 \tag{3}$$

$$0.3 < |ft3/ft4| < 0.85 \tag{4}$$

where fti is a focal length of an i-th lens unit from the object side in the tilt lens unit.

3. The tilt lens system according to claim 1,
wherein the positive lens unit located nearest to the object side in the tilt lens unit includes a negative lens having a concave surface with a larger curvature on the image side, and a positive lens having a convex surface with a larger curvature on the object side, in order from the object side, the surfaces of the two lenses of the positive lens unit facing each other having extremely approximate curvatures, or the two lenses being cemented, and
wherein Conditional Expression (5) is satisfied as follows, $$(nt11 - nt12) > 0.17 \tag{5}$$

where nt11 is a refractive index of the negative lens in the positive lens unit, and nt12 is a refractive index of the positive lens in the positive lens unit.

4. The tilt lens system according to claim 1,
wherein the negative lens unit, which is the second lens unit from the object side in the tilt lens unit, includes a positive lens having a convex surface with a larger curvature on the image side, and a negative lens having a concave surface with a larger curvature on the object side, in order from the object side, the surfaces of the two lenses of the negative lens unit facing each other having extremely approximate curvatures, or the two lenses being cemented, and
wherein Conditional Expression (6) is satisfied as follows, $$(nt21 - nt22) < -0.1 \tag{6}$$

where nt21 is a refractive index of the positive lens in the negative lens unit, and nt22 is a refractive index of the negative lens in the negative lens unit.

5. The tilt lens system according to claim 1,
wherein the positive lens unit located nearest to the object side in the tilt lens unit includes a negative lens having a concave surface with a larger curvature on the image side, a biconvex lens, and a negative lens having a concave surface on the object side, in order from the object side, the surfaces of the three lenses of the positive lens unit facing each other having extremely approximate curvatures, or the three lenses being cemented, and
wherein Conditional Expressions (5) and (7) are satisfied as follows, $$(nt11-nt12)>0.17 \tag{5}$$

$$(nt12-nt13)<-0.07 \tag{7}$$

where nt11 is a refractive index of the negative lens on the object side in the positive lens unit, nt12 is a refractive index of the biconvex lens in the positive lens unit, and nt13 is a refractive index of the negative lens on the image side in the positive lens unit.

6. The tilt lens system according to claim 1,
wherein the positive lens unit located nearest to the object side in the tilt lens unit includes a negative lens having a concave surface with a larger curvature on the image side, a biconvex lens, and a negative lens having a concave surface on the object side, in order from the object side, the surfaces of the three lenses of the positive lens unit facing each other having extremely approximate curvatures, or the three lenses being cemented, and
wherein Conditional Expressions (5) and (8) are satisfied as follows, $$(nt11-nt12)>0.17 \tag{5}$$

$$(nt12-nt13)>0.02 \tag{8}$$

where nt11 is a refractive index of the negative lens on the object side in the positive lens unit, nt12 is a refractive index of the biconvex lens in the positive lens unit, and nt13 is a refractive index of the negative lens on the image side in the positive lens unit.

7. The tilt lens system according to claim 1, further comprising:
a fixed lens unit arranged between the focus lens unit and the tilt lens unit, the fixed lens unit being fixed relative to an image pickup surface during focusing.

8. The tilt lens system according to claim 7,
wherein the fixed lens unit includes a cemented lens composed of a positive lens and a negative lens, in order from the object side, and
wherein Conditional Expression (9) is satisfied as follows, $$0.5<\beta f<1.2 \tag{9}$$

where βf is a lateral magnification of the fixed lens unit.

9. The tilt lens system according to claim 1,
wherein the focus lens unit includes a negative lens having a concave surface with a larger curvature on the image side, a first biconvex lens, the diaphragm, a negative lens having a concave surface on the object side, a second biconvex lens, and a positive lens having a convex surface with a larger curvature on the image side, and
wherein Conditional Expression (10) is satisfied as follows, $$1.25<h2/h1<1.6 \tag{10}$$

where h1 is a paraxial ray height of a ray incident in parallel to the optical axis, and h2 is a paraxial ray height of a ray when exiting from the first biconvex lens, which is measured with respect to h1.

10. An image pickup apparatus comprising:
a tilt lens system; and
an image pickup device converting an optical image formed with the tilt lens system into an electric signal,
wherein the tilt lens system includes
a focus lens unit being movable during focusing,
a diaphragm sharing a primary optical axis with the focus lens unit at the center of the diaphragm and being arranged with or within the focus lens unit, and
a tilt lens unit having a negative refractive power and having an optical axis capable of being tilted with respect to the primary optical axis, the tilt lens unit being arranged on an image side of the focus lens unit and the diaphragm,
wherein Conditional Expressions (1) and (2) are satisfied as follows, $$1.3<\beta t<1.7 \tag{1}$$

$$0<P<H1 \tag{2}$$

where βt is a lateral magnification of the tilt lens unit when the optical axis is not tilted, P is a distance from a most object side surface of the tilt lens unit to a rotating center of the tilt lens unit when the optical axis of the tilt lens unit is tilted, and H1 is a distance from the most object side surface of the tilt lens unit to a first principal point of the tilt lens unit.

* * * * *